United States Patent
Tsubusaki

(10) Patent No.: US 10,462,374 B2
(45) Date of Patent: Oct. 29, 2019

(54) ZOOMING CONTROL APPARATUS, IMAGE CAPTURING APPARATUS AND CONTROL METHODS THEREOF

(71) Applicant: CANON KABUSHIKI KAISHA, Tokyo (JP)

(72) Inventor: Akihiro Tsubusaki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/233,625

(22) Filed: Dec. 27, 2018

(65) Prior Publication Data

US 2019/0132522 A1 May 2, 2019

Related U.S. Application Data

(63) Continuation of application No. 15/459,847, filed on Mar. 15, 2017, now Pat. No. 10,200,620.

(30) Foreign Application Priority Data

Mar. 17, 2016 (JP) .................... 2016-054469

(51) Int. Cl.
| | | |
|---|---|---|
| H04N 5/232 | (2006.01) | |
| G01S 3/00 | (2006.01) | |
| G01S 11/12 | (2006.01) | |

(52) U.S. Cl.
CPC ........... H04N 5/23296 (2013.01); G01S 3/00 (2013.01); H04N 5/23212 (2013.01);
(Continued)

(58) Field of Classification Search
CPC ........... H04N 5/23296; H04N 5/23287; H04N 5/23212; H04N 5/23258; H04N 5/23219; G01S 3/00; G01S 11/12
See application file for complete search history.

(56) References Cited

U.S. PATENT DOCUMENTS

| 8,817,161 B2* | 8/2014 | Hosoe ............... G06K 9/00255 |
| | | 348/333.02 |
| 2007/0035628 A1 | 2/2007 | Kanai |

(Continued)

FOREIGN PATENT DOCUMENTS

| JP | 04-304405 A | 10/1992 |
| JP | 07-135593 A | 5/1995 |

(Continued)

OTHER PUBLICATIONS

The above foreign patent documents were cited in the Sep. 6, 2019 Japanese Office Action, which is enclosed without an English Translation, that issued in Japanese Patent Application No. 2016054469.

*Primary Examiner* — Timothy J Henn
(74) *Attorney, Agent, or Firm* — Cowan, Liebowitz & Latman, P.C.

(57) ABSTRACT

A zooming control apparatus comprises an object detection unit configured to detect an object from an image; a first acquisition unit configured to acquire information regarding a distance to the object; and a zooming control unit configured to perform zooming control for automatically changing a zoom magnification according to at least one of second information that includes information regarding a size of the object detected by the object detection unit and first information regarding the distance to the object acquired by the first acquisition unit, wherein a condition for automatically changing the zoom magnification in the zooming control differs according to a reliability of the first information.

7 Claims, 20 Drawing Sheets

(52) U.S. Cl.
CPC ..... *H04N 5/23219* (2013.01); *H04N 5/23258* (2013.01); *H04N 5/23287* (2013.01); *G01S 11/12* (2013.01)

(56) References Cited

U.S. PATENT DOCUMENTS

| | | | |
|---|---|---|---|
| 2011/0243538 A1* | 10/2011 | Morimoto | H04N 5/23219 396/77 |
| 2011/0304749 A1 | 12/2011 | Ishikawa | |
| 2011/0305445 A1* | 12/2011 | Yasuda | H04N 5/23212 396/78 |
| 2012/0019664 A1 | 1/2012 | Watanabe | |
| 2014/0307072 A1 | 10/2014 | Takahashi | |
| 2014/0320702 A1* | 10/2014 | Tsubusaki | H04N 5/23296 348/240.3 |
| 2015/0296317 A1 | 10/2015 | Park et al. | |
| 2016/0021316 A1* | 1/2016 | Tsubusaki | H04N 5/23219 348/240.1 |
| 2016/0191809 A1* | 6/2016 | Ogawa | H04N 5/23296 348/240.2 |
| 2016/0295125 A1* | 10/2016 | Osawa | H04N 5/23296 |
| 2017/0104938 A1* | 4/2017 | Shimosato | H04N 5/23251 |
| 2018/0027186 A1 | 1/2018 | Jung et al. | |

FOREIGN PATENT DOCUMENTS

| | | |
|---|---|---|
| JP | 2010-282102 A | 12/2010 |
| JP | 2015-043557 A | 3/2015 |

* cited by examiner

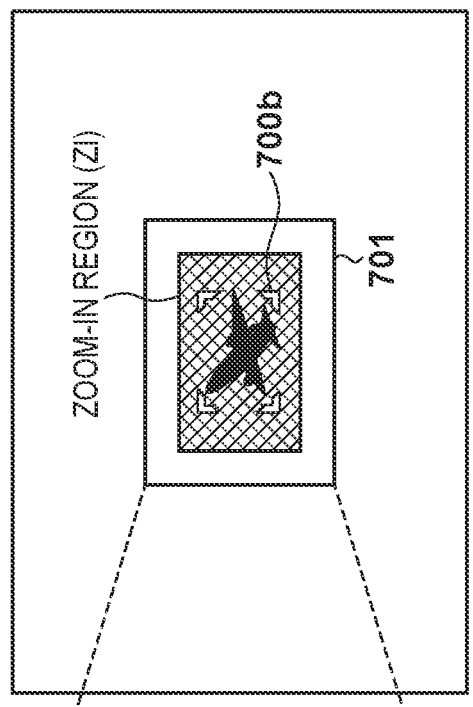
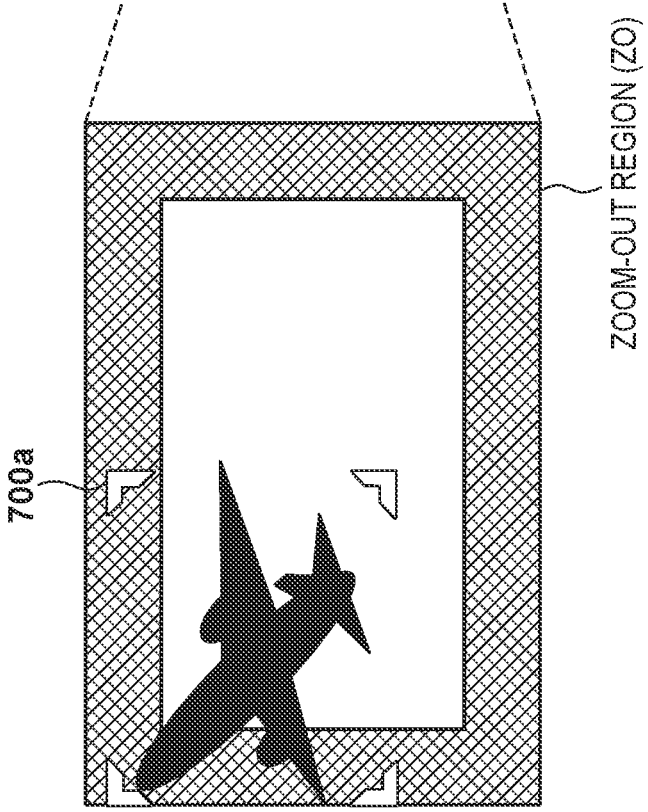

FIG. 8A
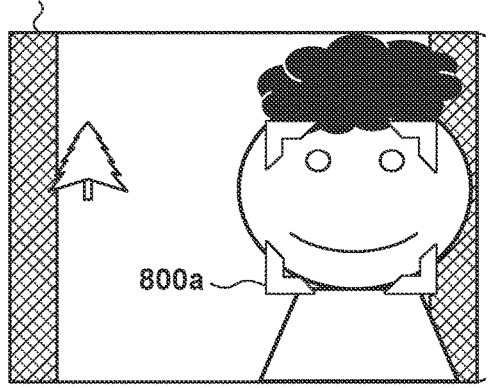
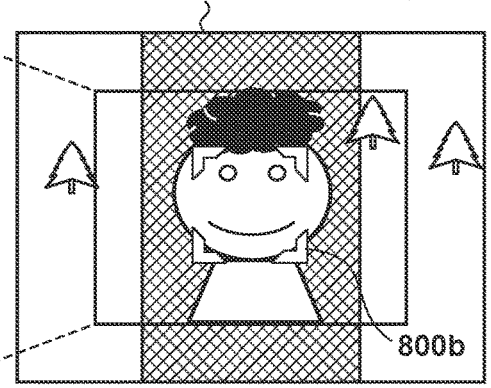
FIG. 8B
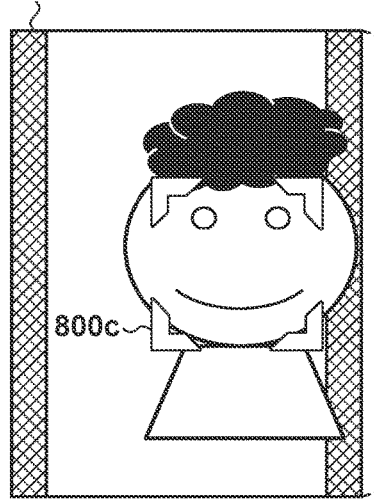
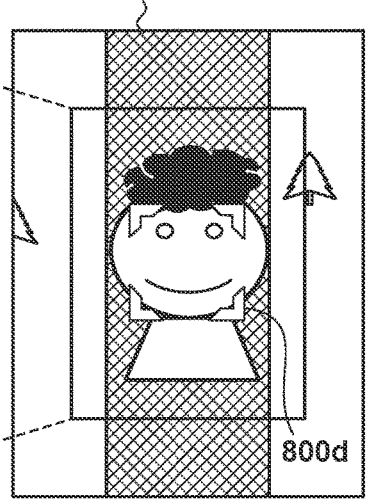
FIG. 8C
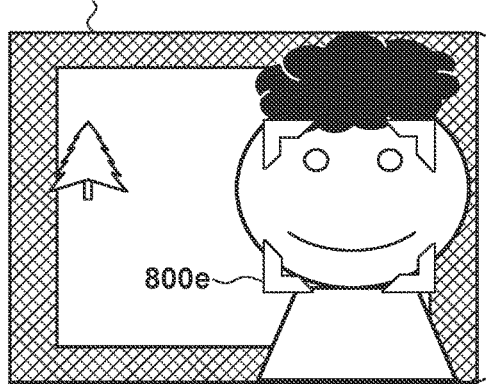
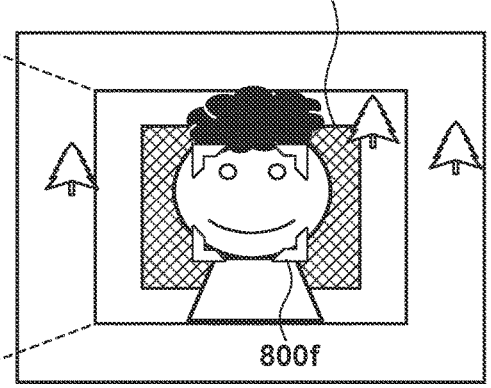

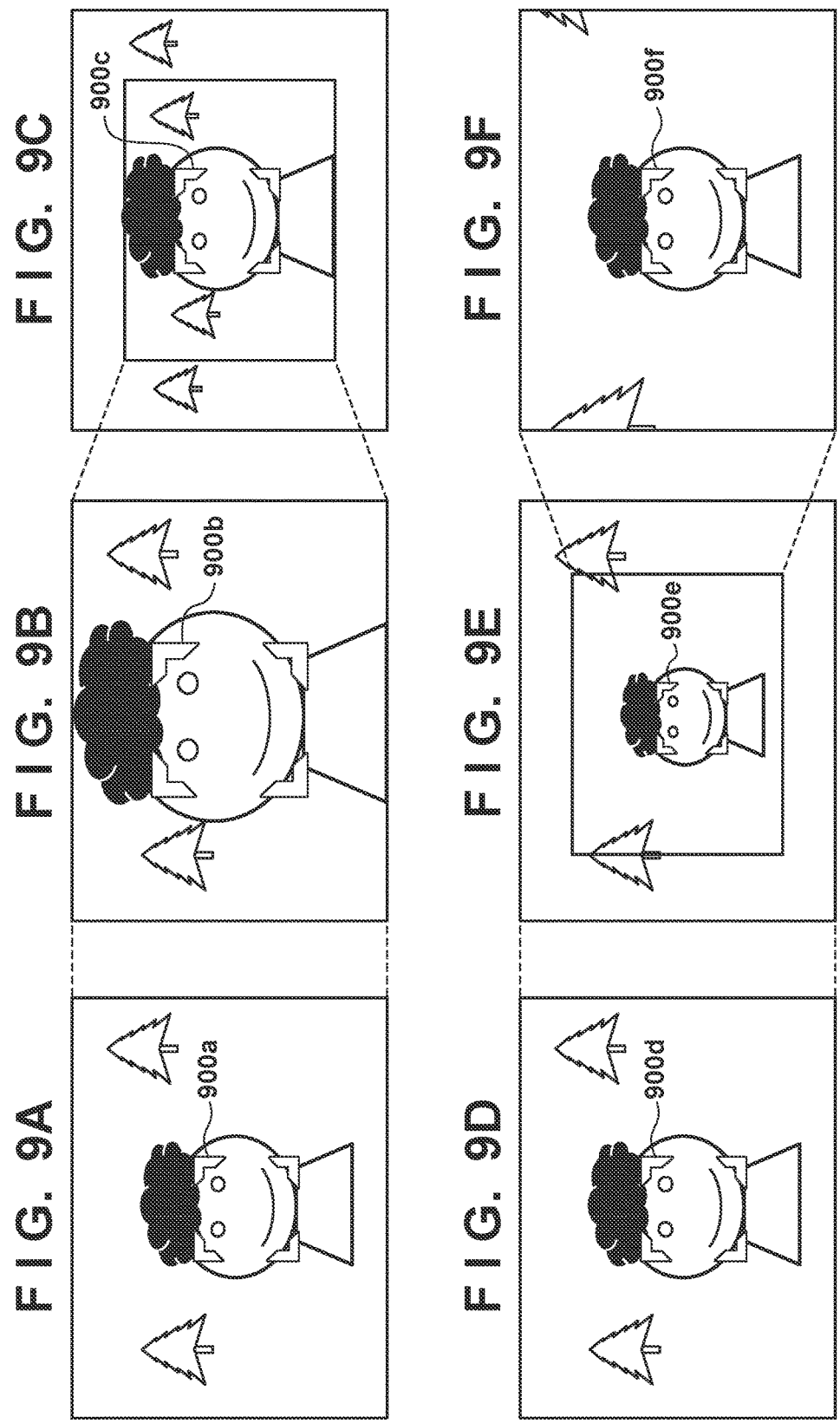

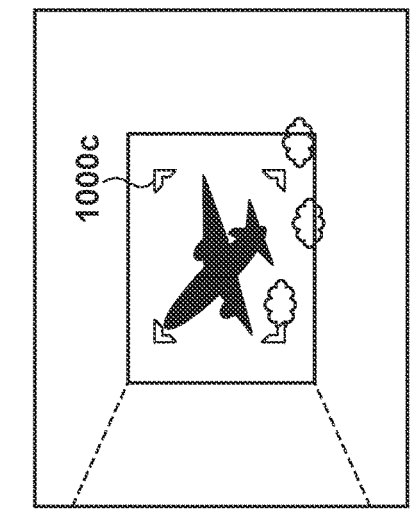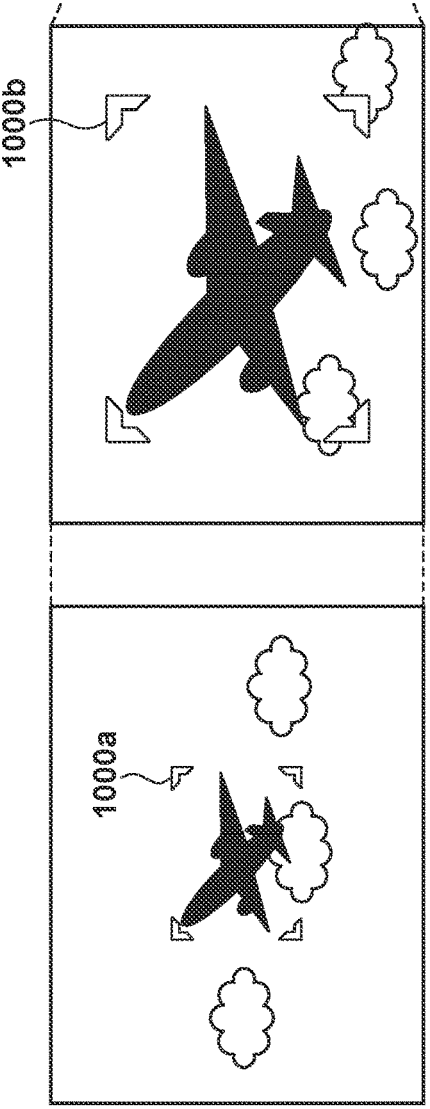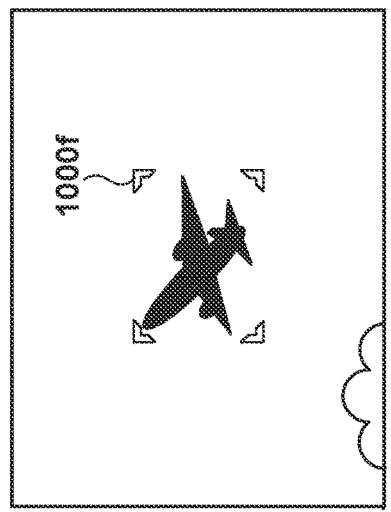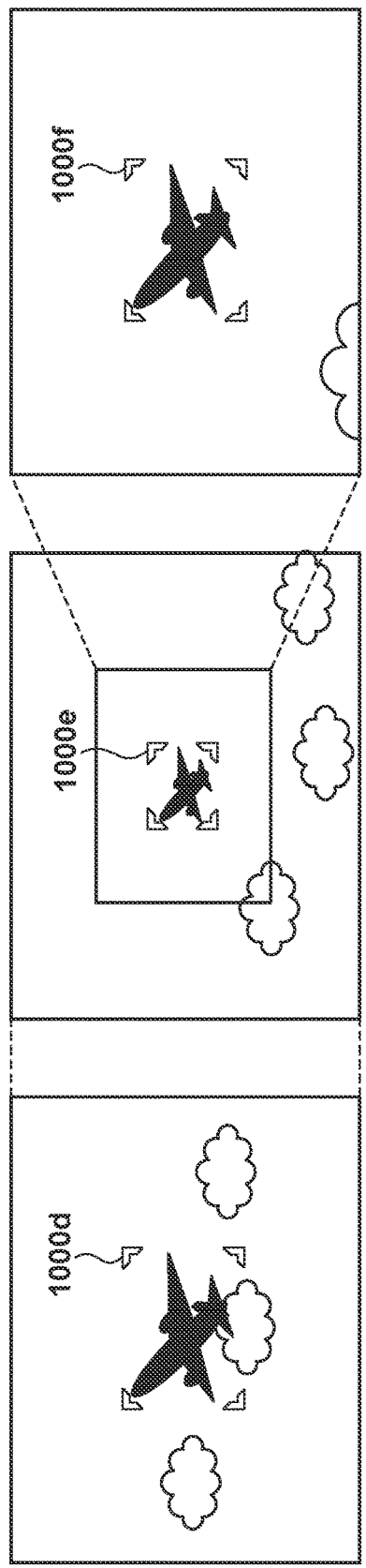

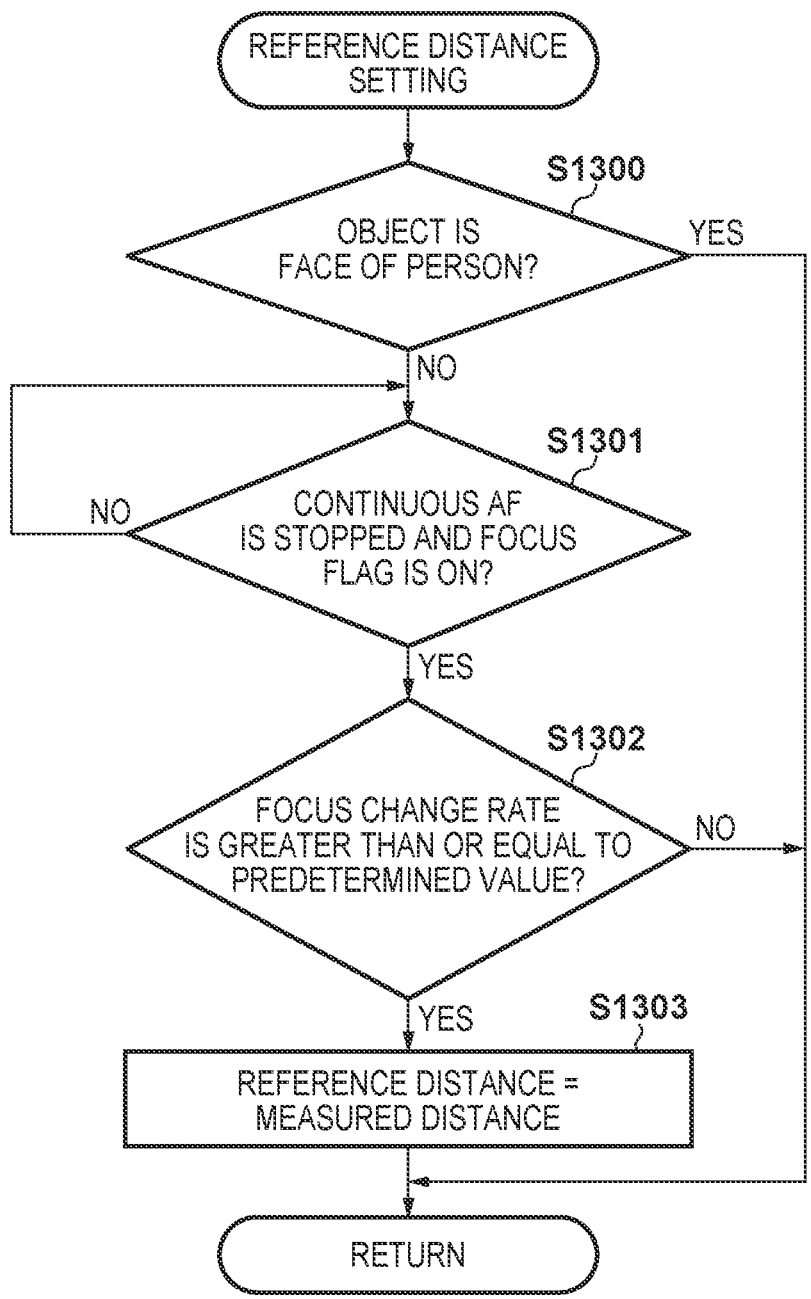

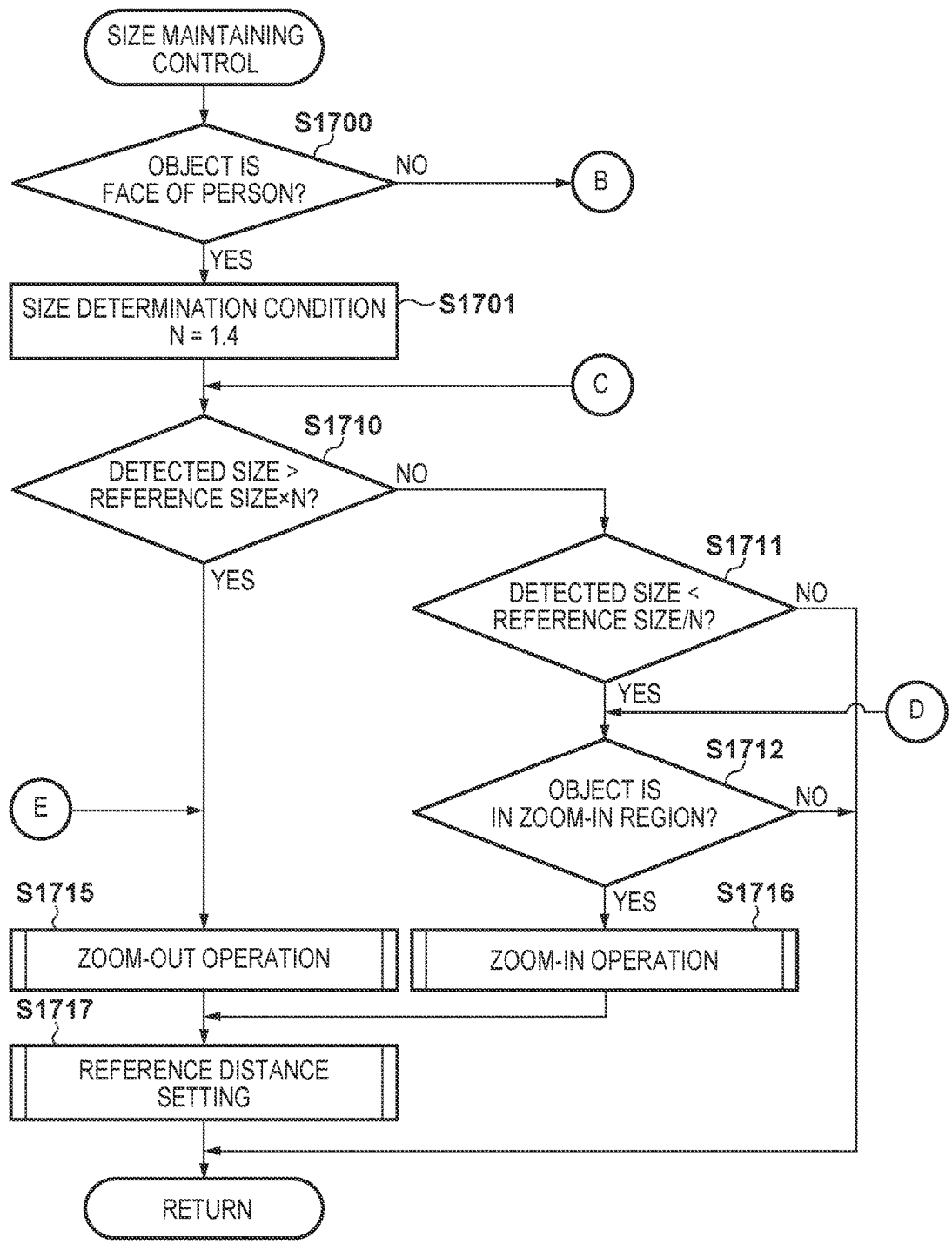

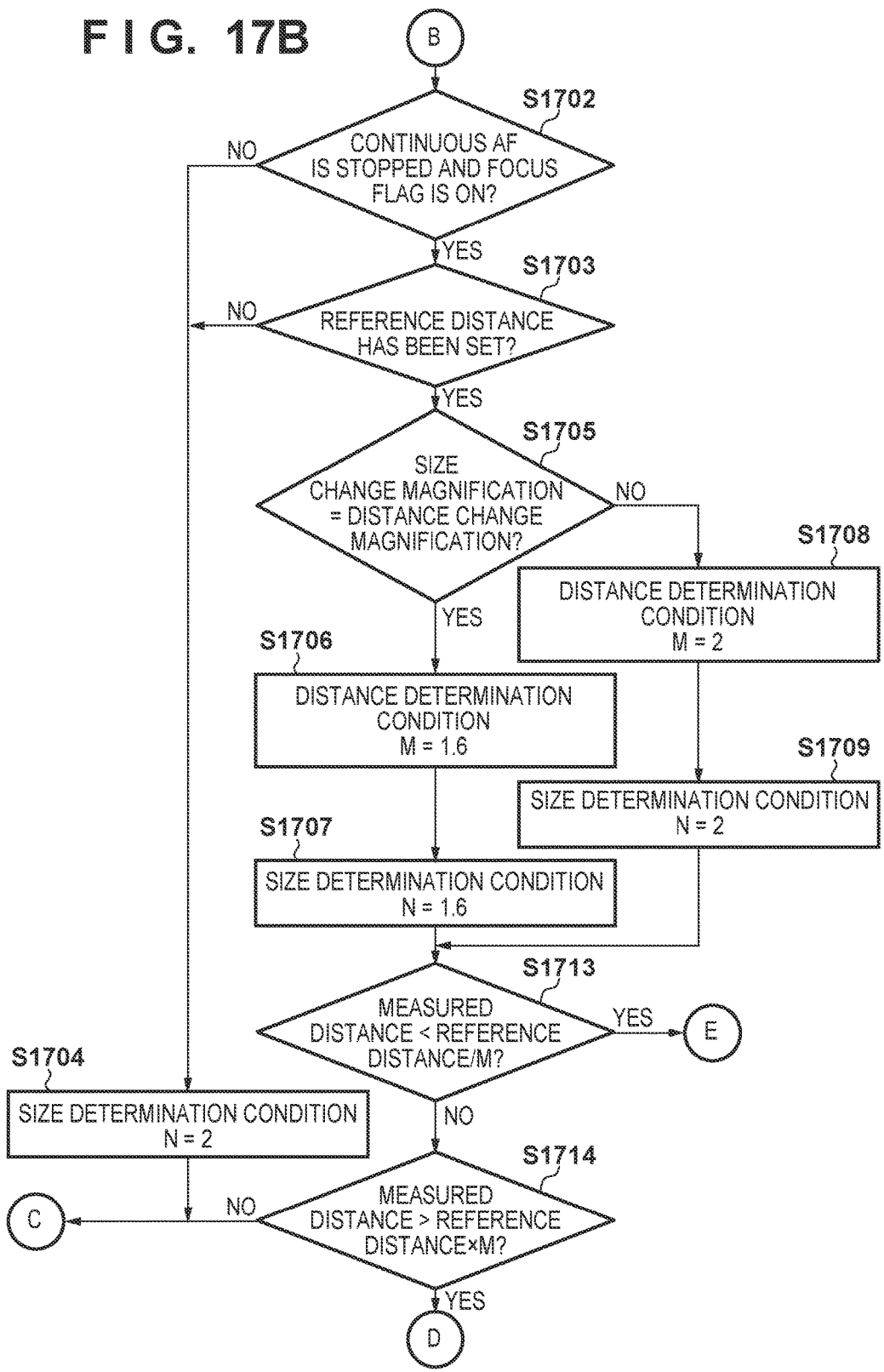

ZOOMING CONTROL APPARATUS, IMAGE CAPTURING APPARATUS AND CONTROL METHODS THEREOF

CROSS-REFERENCE TO RELATED APPLICATION

This application is a continuation of application Ser. No. 15/459,847, filed Mar. 15, 2017, the entire disclosure of which is hereby incorporated by reference.

BACKGROUND OF THE INVENTION

Field of the Invention

The present invention relates to an image capturing apparatus provided with a zooming control apparatus.

Description of the Related Art

Some image capturing apparatuses such as digital cameras have a function for performing optical resizing (hereinafter, referred to as optical zooming) by driving a zoom lens and a function for performing electronic resizing (hereinafter, referred to as electronic zooming) by enlarging a portion of an image. Furthermore, some image capturing apparatuses have an automatic zooming (automatic resizing) function for performing object detection and automatically changing the zoom magnification for a specific object. Techniques for controlling a zoom operation using such an optical zooming function and an electronic zooming function are described in Japanese Patent Laid-Open No. 2015-43557 and Japanese Patent Laid-Open No. 7-135593.

Japanese Patent Laid-Open. No. 2015-43557 describes an automatic zooming function for preventing an object from being framed out and an automatic zooming function for maintaining the size of an object image constant. In Japanese Patent Laid-Open No. 2015-43557, the shape of the face of a person or the characteristic color of an object other than a person is detected, and in the case where the detected object moves in a direction outside the angle of view and is about to be framed out of the angle of view, frame-out is prevented by zooming out the zoom lens. Also, in Japanese Patent Laid-Open No. 2015-43557, in the case where the detected object moves in the front and back direction and thereby the size of the object image changes, the zoom lens is driven so as to maintain the original size.

Moreover, Japanese Patent Laid-Open No. 7-135593 describes the automatic zooming function for maintaining the size of the object image substantially constant based on the focusing position of a focus lens. In Japanese Patent. Laid-Open No. 7-135593, an object distance is measured from the focus position when the object is in focus with autofocus (AF) control, and it is detected that the object has moved relative to the camera in the front and back direction, thereby changing the object distance. The size of the object image is maintained substantially constant by driving the zoom lens by a change amount of the size of the object image equivalent to the change amount of the object distance.

However, Japanese Patent Laid-Open No. 2015-43557 above, in the case where the characteristic color of an object other than a person is detected as an object region, if a region of the same type of color exists in the background or in an object other than a person, or if a light source changes, there is a possibility that a detection error of the position and size of the object region becomes large. Moreover, according to Japanese Patent Laid-Open No. 7-135593 above, in the case where the object distance is measured when focusing by AF is not complete, or in a region in which the depth of field is deep and the object is focused over a wide distance with respect to a unique focus position, there is a possibility that a measurement error of the object distance becomes large. If automatic zooming is performed on an object other than a person in this manner, there is a possibility that automatic zooming will malfunction or not operate normally due to a detection error of the position and the size of the object image or a measurement error of the object distance.

SUMMARY OF THE INVENTION

The present invention has been made in consideration of the aforementioned problems, and realizes a technique that enables appropriate zooming control according to a detected object.

In order to solve the aforementioned problems, the present invention provides a zooming control apparatus comprising: an object detection unit configured to detect an object from an image; a first acquisition unit configured to acquire first information regarding a distance to the object; and a zooming control unit configured to perform zooming control for automatically changing a zoom magnification according to at least one of second information that includes information regarding a size of the object detected by the object detection unit and the first information regarding the distance to the object acquired by the first acquisition unit, wherein a condition for automatically changing the zoom magnification in the zooming control differs according to a reliability of the first information.

In order to solve the aforementioned problems, the present invention provides an image capturing apparatus comprising: the foregoing zooming control apparatus; an image capturing unit configured to capture an object and generate image data; and a display unit configured to display the image, wherein the zooming control unit controls a zoom magnification of the object in the image displayed on the display unit.

In order to solve the aforementioned problems, the present invention provides a control method of a zooming control apparatus comprising: detecting an object from an image; acquiring first information regarding a distance to the object; and performing zooming control for automatically changing a zoom magnification according to at least one of second information that includes information regarding a size of the detected object and first information regarding a distance to the object, wherein a condition for automatically changing the zoom magnification in the zooming control differs according to a reliability of the first information.

In order to solve the aforementioned problems, the present invention provides a non-transitory computer-readable storage medium storing a program for causing a computer to execute a control method of a zooming control apparatus comprising: detecting an object from an image; acquiring first information regarding a distance to the object; and performing zooming control for automatically changing a zoom magnification according to at least one of second information that includes information regarding a size of the detected object and first information regarding a distance to the object, wherein a condition for automatically changing the zoom magnification in the zooming control differs according to a reliability of the first information.

According to the present invention, appropriate zooming control can be performed in accordance with a detected object.

Further features of the present invention will become apparent from the following description of exemplary embodiments (with reference to the attached drawings).

BRIEF DESCRIPTION OF THE DRAWINGS

FIGS. 7A and 7B are diagrams illustrating processing for preventing frame-out of an object other than a person.

FIGS. 8A to 8C are diagrams illustrating processing for preventing frame-out of an object that is a person.

FIGS. 9A to 9F are diagrams illustrating processing for preventing size change of an object that is a person.

FIGS. 10A to 10F are diagrams illustrating processing for preventing size change of an object other than a person.

FIG. 13 is a flowchart showing detailed reference distance setting processing in FIG. 11.

FIGS. 17A and 17B are flowcharts showing detailed size maintaining control processing in FIG. 14 of a second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

A digital camera 100 that has an automatic zooming function will be described below as an example of an image capturing apparatus provided with a zooming control apparatus according to this embodiment.

Note that this embodiment is intended for an image capturing apparatus such as a digital still camera and a digital video camera, but the present invention may be applied to a mobile phone equipped with a camera, or information processing apparatuses such as a smart phone, which is one type of such a mobile phone, and a tablet terminal.

Apparatus Configuration

Figure 1:
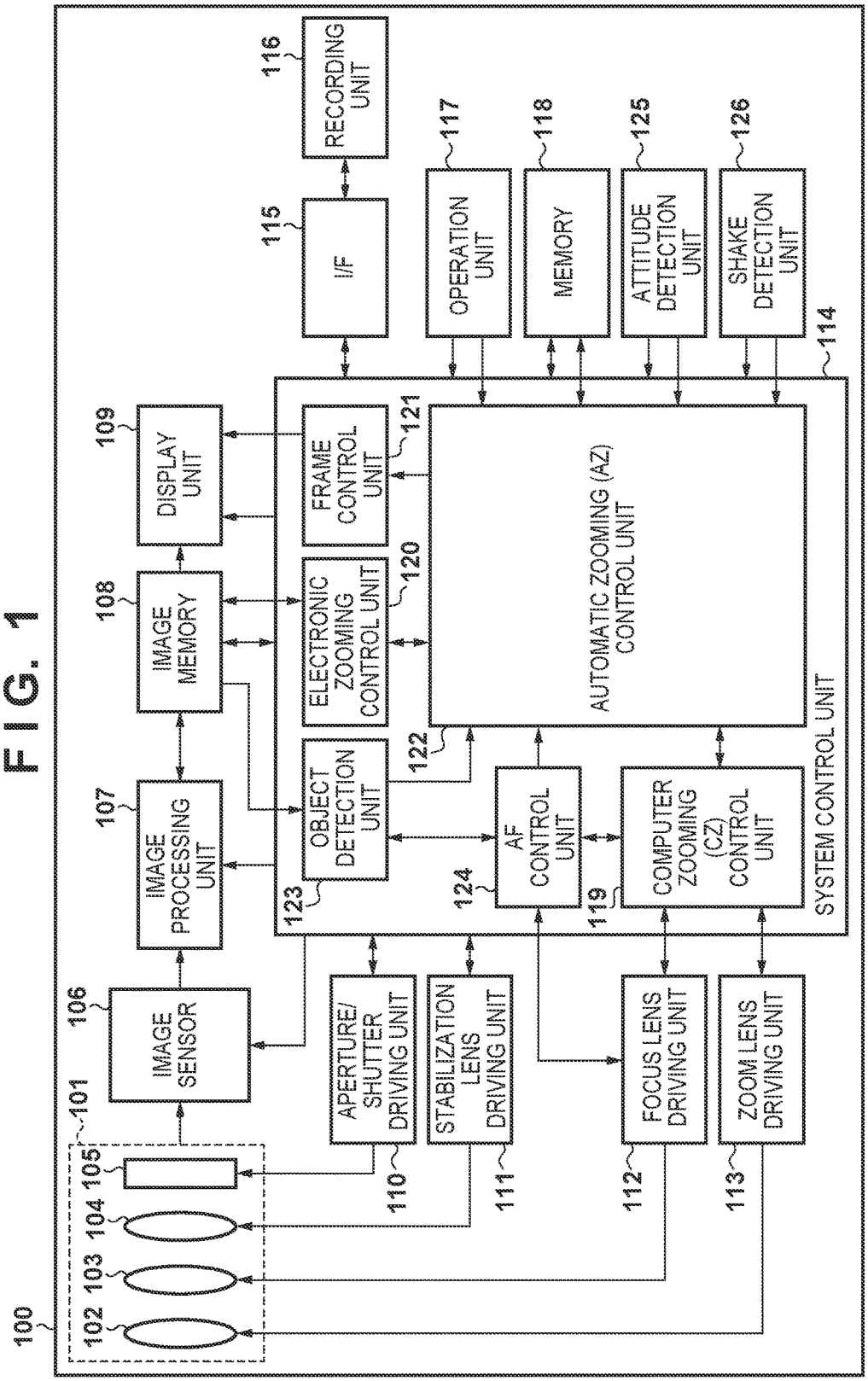
FIG. 1 is a block diagram showing an apparatus configuration of embodiments of the present invention.

First, the configuration and the functions of the image capturing apparatus of this embodiment will be described with reference to FIG. 1.

A lens barrel 101 holds a lens group therein. A zoom lens 102 in the lens barrel 101 is moved in the optical axis direction so as to adjust the focal length, and optically change the angle of view (move the zoom position). Also, a focus lens 103 in the lens barrel 101 is moved in the optical axis direction so as to perform focusing. A stabilization lens 104 is a correction lens for correcting image blur caused by camera shake. An aperture-and-shutter 105 for adjusting a light amount is used for exposure control. Note that, in the digital camera 100 of this embodiment, the lens barrel 101 and a camera body are integrally constituted, but the present invention is not limited thereto, and is also applicable to an interchangeable lens type camera in which a lens unit is detachable from the camera main body, and the like.

An image sensor 106 generates imaging signals by receiving light that has passed through the lens barrel 101, and converting the object image into electrical signals by photoelectric conversion. The image sensor 106 is a CCD (charge coupled device) or CMOS (complementary metal oxide semiconductor) image sensor, or the like. The imaging signals generated by the image sensor 106 are input to an image processing unit 107, undergo various types of image processing such as pixel interpolation processing and color conversion processing, and are stored as image data in an image memory 108. The image memory 108 is constituted by a DRAM (Dynamic Random Access Memory), a SRAM (Static Random Access Memory) or the like.

A display unit 109 is constituted by a TFT LCD (thin film transistor liquid crystal display) or the like, and displays shot image data and specific information (e.g., shooting information and a tracking frame). An electronic viewfinder (EVF) function for the photographer to adjust the angle of view is realized by such information display such as live view of a shot image.

An aperture/shutter driving unit 110 calculates an exposure control value (an aperture value and a shutter speed) based on luminance information acquired by image processing in the image processing unit 107, and drives the aperture-and-shutter 105 based on the calculation result. Accordingly, automatic exposure (AE) control is performed. A stabilization lens driving unit 111 calculates a blurring amount applied to the digital camera 100 based on information from an angular velocity sensor such as a gyro sensor, and drives the stabilization lens 104 so as to eliminate (or reduce) blurring.

A focus lens driving unit 112 drives the focus lens 103 based on automatic focus adjustment (autofocus (AF)) control. For example, in the case of performing contrast AF control, the focus lens driving unit 112 drives the focus lens 103 based on focus adjustment information (contrast evaluation value) of the imaging optical system acquired by the image processing unit 107 performing image processing, such that the object is focused. Note that AF control in this embodiment is not limited to contrast AF control, and a phase difference AF method may be applied as another AF control, and AF control may be performed by a plurality of methods by combining a contrast method and another method.

The zoom lens driving unit 113 drives the zoom lens 102 in accordance with a zoom operation instruction from the photographer. An operation unit 117 includes a zoom lever, a zoom button and the like as zooming operation members for the photographer to instruct the camera to perform zooming. A system control unit 114 calculates a zoom driving speed and a zoom driving direction based on an operation amount and an operation direction of a zooming operation member, and performs control so as to move the zoom lens 102 along the optical axis in accordance with the calculation result.

Image data generated by performing a shooting operation is output to a recording unit 116 via an interface (I/F) unit 115 and is recorded. The image data is recorded in one of or both an external recording medium and a non-volatile memory 118. The external recording medium is a memory card or the like that is mounted to the digital camera 100 to be used. The non-volatile memory 118 is a storage medium build into the digital camera 100. The memory 118 stores, in addition to program data and image data, setting information of the digital camera 100 and information such as a zoom-in position in an automatic zooming function, which will be described later.

The operation unit 117 includes, in addition to the above zooming operation members, a release switch for instructing shooting start, an automatic zooming switch for instructing the start and end of the automatic zooming function, and the like. Operation signals from the operation unit 117 are sent to the system control unit 114.

The system control unit 114 includes a calculation apparatus such as a CPU (central processing unit). The system control unit 114 performs overall control of the camera by sending a control instruction to each constituent element in accordance with an operation of the photographer. Also, the system control unit 114 executes various control programs stored in the memory 118, for example, programs for performing control of the image sensor 106, AE/AF control, zooming control (including automatic zooming processing) and the like.

Automatic Zooming Control

Next, control related to the automatic zooming function of the system control unit 114 will be described. Note that FIG. 1 shows internal processing of the system control unit 114 using function blocks 119 to 123.

If the lens barrel 101 is a rear focusing type, it is necessary to move the focus lens 103 to an appropriate focus position in accordance with the position of the zoom lens 102 in order to maintain an in-focus state when changing the angle of view by optical zooming. Such control is called computer zooming (CZ) control. This CZ control is performed by a CZ control unit 119 in the system control unit 114.

Figure 2:
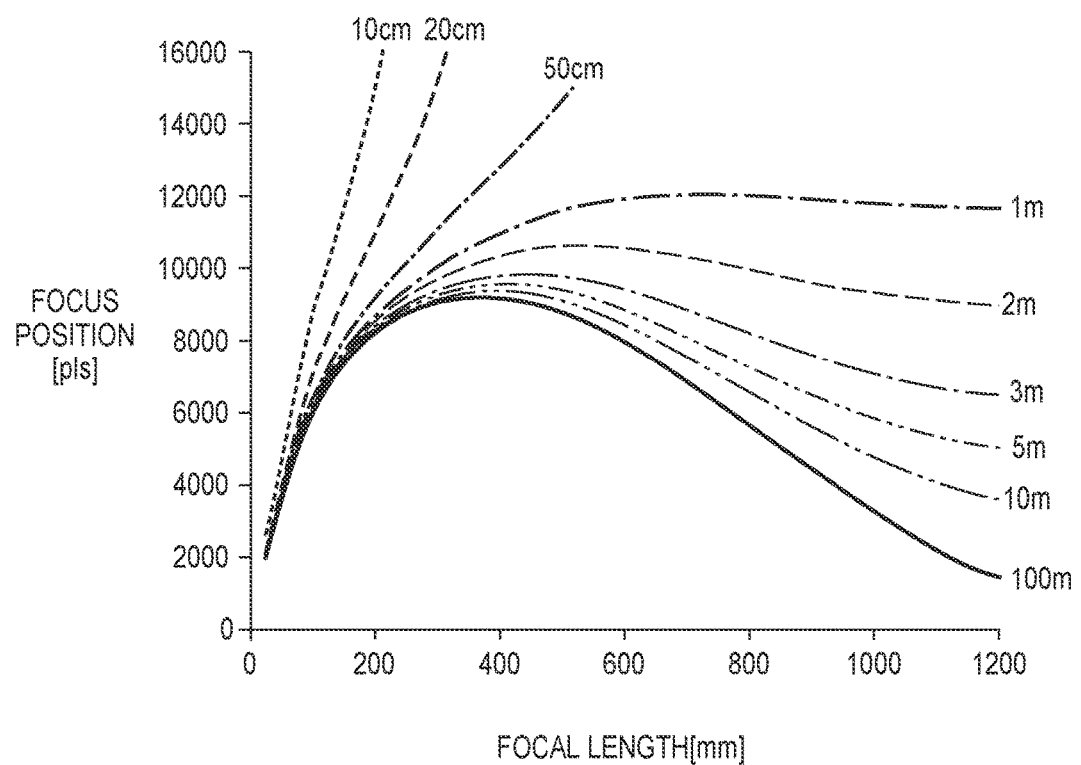
FIG. 2 is a diagram illustrating the relationship between a focal length and a focus lens position for each object distance.

FIG. 2 shows, as a data table, a graph indicating the relationship between a focal length of the zoom lens and a focus position at which an object is focused, for each distance to the object. This table is referred to as a focus cam table in FIG. 2, the horizontal axis indicates a focal length (Focallength) corresponding to a zoom position, and the vertical axis indicates Focus Position, and a distance (object distance) from the camera to the object is shown next to each of the line graphs. The system control unit 114 controls the focus lens driving unit 112 during an AF operation so as to move the focus lens 103 in a predetermined range, thereby performing a scan operation. A focus position that is a focusing point is detected by a known method by acquiring a contrast evaluation value by this scan operation. Also, the object distance can be acquired from the zoom position and the focus position at that time by referring to the focus cam table.

Next, function blocks in the system control unit. 114 related to the automatic zooming function will be described. As shown in FIG. 1, the system control unit 114 is provided with the CZ control unit. 119, an electronic zooming control unit 120, a tracking frame control unit 121, an automatic zooming (AZ) control unit 122, an object detection unit 123 and an AF control unit 124.

The digital camera 100 has an optical zooming function and an electronic zooming function. The CZ control unit 119 and the zoom lens driving unit 113 handle driving control of the lenses related to the optical zooming function. The CZ control unit 119 detects the zoom position of the zoom lens 102 for each predetermined control cycle during a zoom operation, and controls, in accordance with the detected zoom position, the zoom lens driving unit 113 so as to drive the focus lens 103 in conformity with the focus cam table for the object distance acquired by an AF control unit 124, which will be described later. This makes it possible to perform an optical zoom operation while maintaining the in-focus state.

On the other hand, the electronic zooming control unit 120 and the image memory 108 handle control related to the electronic zooming function. The electronic zooming control unit. 120 realizes the electronic zooming function by segmenting data of a target region from image data transferred to the image memory 108. The electronic zooming control unit 120 then realizes smooth electronic zooming display by causing the display unit 109 to display the data while gradually increasing the range that is segmented in a frame rate cycle of the image that is loaded into the image sensor 106.

Figure 3:
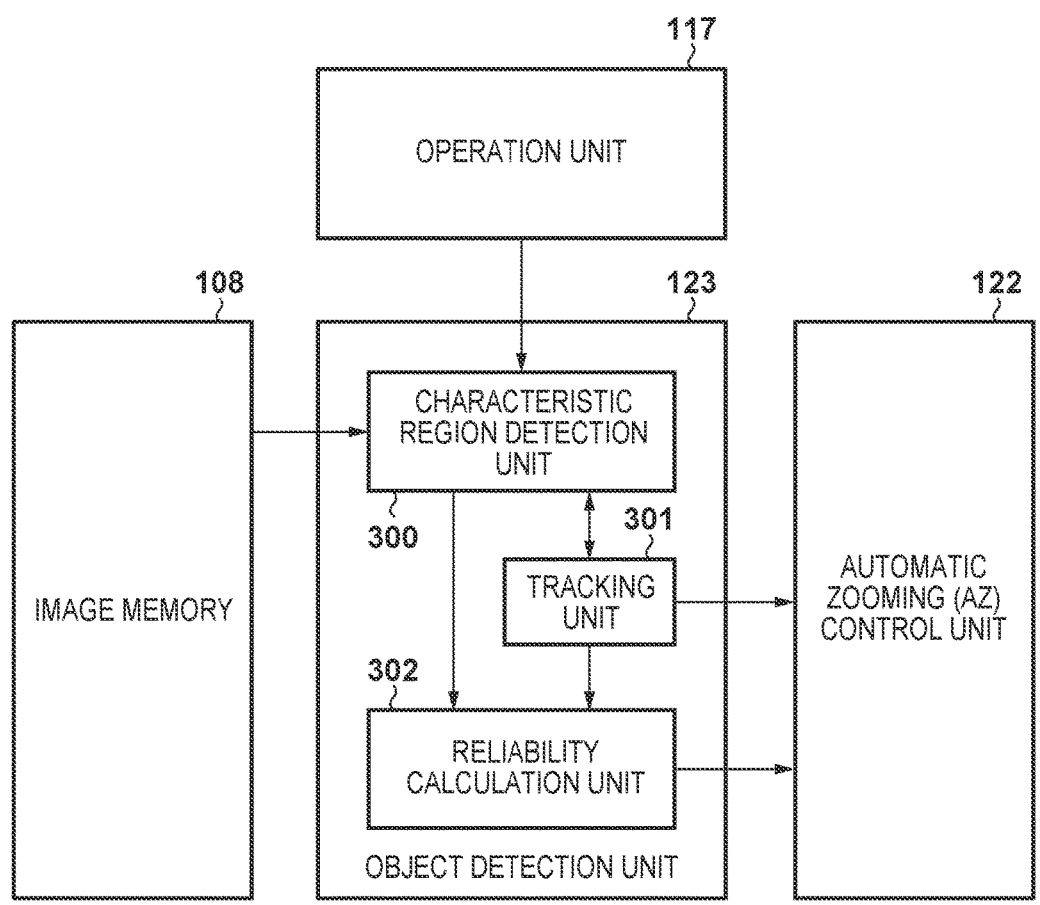
FIG. 3 is a block diagram showing the configuration of an object detection unit.

The object detection unit 123 detects a desired object region from an image region of image data stored in the image memory 108. Here, face detection processing and color detection processing as object detection methods for detecting an object (the face of a person or the like and a body other than a person) based on face information of the person or color information included in the image data will be described. FIG. 3 shows the configuration of the object detection unit 123 that performs object detection processing of this embodiment. The object detection unit 123 includes a characteristic region detection unit 300, a tracking unit 301 and a reliability calculation unit 302. The characteristic region detection unit 300 detects, from an image, the characteristic amount of a face in the case where the object is the face of a person, and detects, from the image, the characteristic color of a body in the case where the object is a body other than a face of a person, in order to estimate an object region (the position and the size of the object in the image). The tracking unit 301 determines an object that moves over a plurality of consecutive frame images, and tracks the same object region. The reliability calculation unit 302 calculates the probability that the object region detected by the characteristic region detection unit 300 is the object, as the reliability (likelihood) of the object.

A frame control unit 121 displays, on the display unit 109, an object designating frame serving as a guide for the photographer to designate an object. The frame control unit 121 also displays, on the display unit 109, an object tracking frame so as to surround the object image such that the object designated by the photographer can be visually recognized. The position and the size of the frame on the screen are calculated by the tracking unit 301 based on face information and color information, and is updated at a frame rate cycle.

First, face detection processing and color detection processing of the characteristic region detection unit 300 will be described.

The face detection processing is processing for detecting a face region that exists in image data using a known algorithm. For example, the characteristic region detection unit 300 extracts a characteristic amount from a square partial region in the image data, and compares the characteristic amount to a face characteristic amount prepared in advance. If the correlation value of those amounts exceeds a predetermined threshold, the characteristic region detection unit 300 determines that the partial region is a face region. Various face regions that exist in the image can be detected by repeating this determination processing while changing the combination of the size, the arrangement position and the arrangement angle of the partial region. In addition, in the case where there is a face authentication function, pattern matching between characteristic amounts of face images registered in advance and a characteristic amount of a detected face region is executed by a known algorithm, and a registered face image whose correlation value is the highest is authenticated as the detected face. Moreover, in the case where the correlation values for all of the registered face images are smaller than the predetermined value, it is determined that the detected face region is a face that is not registered.

In the color detection processing, the color information of an object region designated in accordance with an object designating method, which will be described later, is stored as a characteristic color. The color detection processing is executed in the case where a detected object is a body other than a face of a person. RGB signals that are output signals from the image processing unit 107, luminance signals (Y), color difference signals (R-Y, B-Y) and the like are used as the color information. During object detection, the characteristic region detection unit 300 divides image data into a plurality of partial regions, and calculates the average value of luminance and color difference for each of the partial regions. The characteristic region detection unit 300 also compares characteristic color information stored in advance to the color information of each region during the object detection, and sets, as candidates for an object region, partial regions in which the differences in luminance and color difference are smaller than or equal to predetermined amounts. A group of adjacent partial regions that are the candidates for an object region is set as a region of the same color, and the region of the same color that is in a predetermined size range is set as a final object region. If the object is a body other than a face of a person, there is a possibility that the shape of the object region is different depending on the body. In view of this, a minimum square region that includes all of the regions of the same color is set as a body region. Therefore, the body region may be a rectangular region whose sizes in the horizontal direction and the vertical direction are different. In addition, the central position of the square region is used as the position of the body region.

Next, object tracking processing by the tracking unit 301 will be described. The object tracking processing is processing for continuously tracking an object region that moves over consecutive frame images as a focusing target. When the automatic zooming function is started, the region of a person or a body serving as a main object is designated in accordance with the object designating method, which will be described later if the designated object is a person, namely, a face, all the faces in the frame image are detected if a plurality of faces are detected in the same image, a face that is closest to the position of the face in the previously preceding frame image is determined as a person to be tracked by the tracking unit 301. In addition, in the case where a detected face is a face registered by a face authentication function, the authenticated face is preferentially determined as a person to be tracked regardless of the positional relationship in frame images. On the other hand, in the case where the designated object is a body other than a face of a person, processing for comparing the characteristic color information is started from the position of the body region in the immediately preceding frame image. If the frame rate is sufficiently higher than the speed of the moving body, it is highly possible that the same body will be detected in nearby regions in consecutive frame images. Accordingly, the moving body region can be tracked by the tracking unit 301 performing processing for matching regions of the same color while shifting a partial region for the comparison upward, downward, to the right and to the left, with an immediately preceding position of the body region serving as an origin.

Next, processing for calculating the reliability of an object performed by the reliability calculation unit 302 will be described. If a detected object is a face region, which is a region whose correlation value with a region constituted by face parts (e.g., a mouth, eyes and a nose) is high, deviation of the size of the detected face region from the size of the actual face is relatively small. In contrast, in the case where the object is a body other than a face of a person, namely, in the case of detecting a region of the same color, there is a possibility that deviation of the position and the size of the body region is greater compared to a face region, in the case where a region of the same type of color exists in an object that is not the background or the main object, due to influence of a change of the light source, and the like. In view of this, in this embodiment, in the case where the object is a body other than a face of a person, automatic zooming is prevented from malfunctioning by using object likelihood, namely, probability as an object for determining whether or not to start a zoom operation. Factors that hinder object probability include change in the object, existence of a similar object, and accumulation of tracking errors. The object likelihood is calculated by multiplying these causes by various evaluation values acquired from matching processing and object region estimation.

Greater difference between the luminance and the color difference of the characteristic color of an object stored when the object region is designated and the luminance and the color difference of a partial region detected for each frame image indicates greater change of the object. In view of this, the reliability calculation unit 302 calculates a value obtained by normalizing, using the number of partial regions, the absolute sum of the difference in luminance and color difference between the characteristic color of the object and the partial regions constituting the body region, such that the greater this value is, the smaller the likelihood of the object becomes.

In addition, in the case where a region whose color is the same as the characteristic color of the object is detected in a region other than the object region that is being tracked and has been determined by the tracking unit 301, it is highly possible that a similar object region exists. If the position of the similar object region is close to the position of the object region that is being tracked, there is a possibility that transfer has been made to another object. Moreover, the histograms of the luminance and the color difference for each partial region are calculated, and in the case of distribution concentrated on a specific range, it is highly possible that the object and the background have the same type of color, or an object that is difficult to identify has been designated. In view of this, in the case where the distance between object regions is smaller than a predetermined value or in the case where a specific histogram ban is greater than a predetermined value, object likelihood is set to be smaller by the reliability calculation unit 302.

Furthermore, once object probability becomes low, the reliability of object tracking after that also becomes low. Therefore, when calculating the likelihood of an object, the history of the likelihood of the object is taken into consideration. For example, the average value of the likelihood of the object for a predetermined period of time is handled as the likelihood of the object of the current frame image. The reliability calculation unit 302 calculates object likelihood. (reliability) in this manner.

When performing AF control, the AF control unit 124 controls the focus lens driving unit 112 so as to move the focus lens 103 in a predetermined range, thereby performing a scan operation. A contrast evaluation value acquired during the scan operation or the like is used to detect a focus position that is a focusing point. An object distance can be acquired with reference to the focus cam table using the zoom position and the focus position at that time.

Autofocus Control

Next, details of AF control performed by the AF control unit 124 of this embodiment and an object distance acquisition method will be described with reference to FIGS. 4 to 6B.

Figure 4:
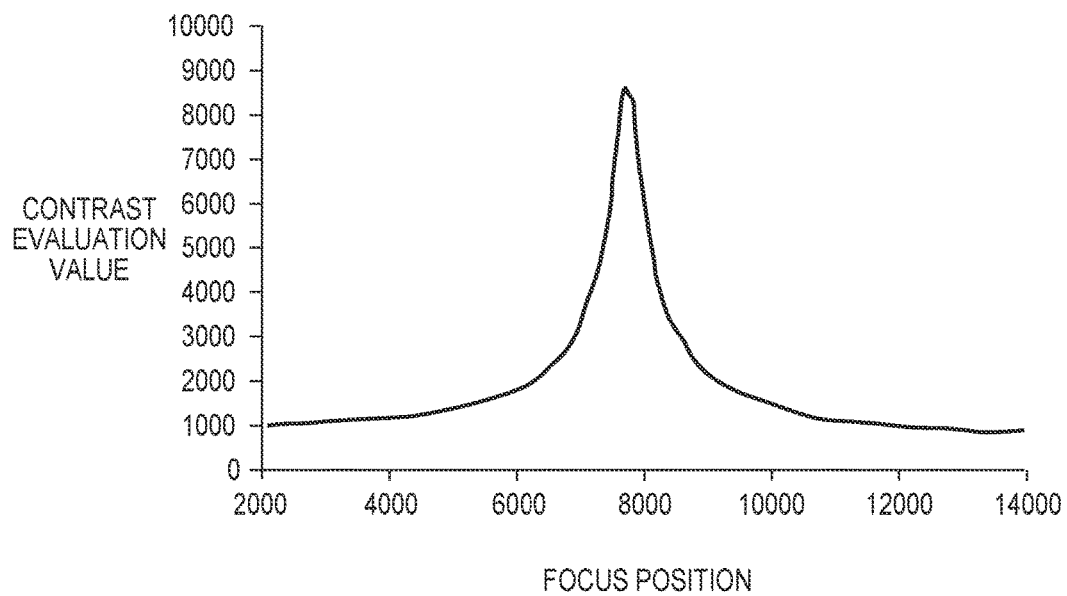
FIG. 4 is a diagram showing the relationship between a focus position and a contrast evaluation value.

FIG. 4 illustrates the relationship between. Focus Position and Contrast Evaluation Value in contrast AF control. The contrast evaluation value is a value acquired by quantifying a high-frequency component of an image using a high pass filter or the like. A higher contrast evaluation value indicates a higher degree of focusing. In addition, AF control has two control modes, namely, a single AF mode that operates when the release switch is half-pressed during still image shooting and a continuous AF mode for keeping an object in focus in an EVF screen for framing the object at all times during moving image shooting. The single AF mode is a mode for detecting, at a high speed, a focus position that is the peak of the mountain of the contrast evaluation value, by moving the focus lens 103 at one time so that the object distance changes from infinity to close up range. In the single AF mode, although a focusing position can be found at high speed, there are cases where the screen becomes heavily blurred for an instant during a scan operation. Therefore, the single AF mode is suitable for AF control during still image shooting during which a release time lag is desired to be shortened as much as possible. On the other hand, the continuous AF mode is a mode for continuously focusing on an object by reversing the focus lens 103 in a range in which focus fluctuation is inconspicuous, for example, in the case where a moving object or the like is continuously tracked. Although it takes a long time to obtain an in-focus state from a heavily blurred state in the continuous AF mode, once an in-focus state is entered, even if the object moves, it is possible to continuously focus on the object. Therefore, the continuous AF mode is suitable for AF control during moving image shooting in which the object is continuously focused on at all times even in the case of an EVF screen for framing an object and the case of a moving object. The AZ control unit 122 realizes the automatic zooming function by moving the zoom lens 102 based on a change amount of the object distance when the object is focused in the continuous AF mode.

Figure 5:
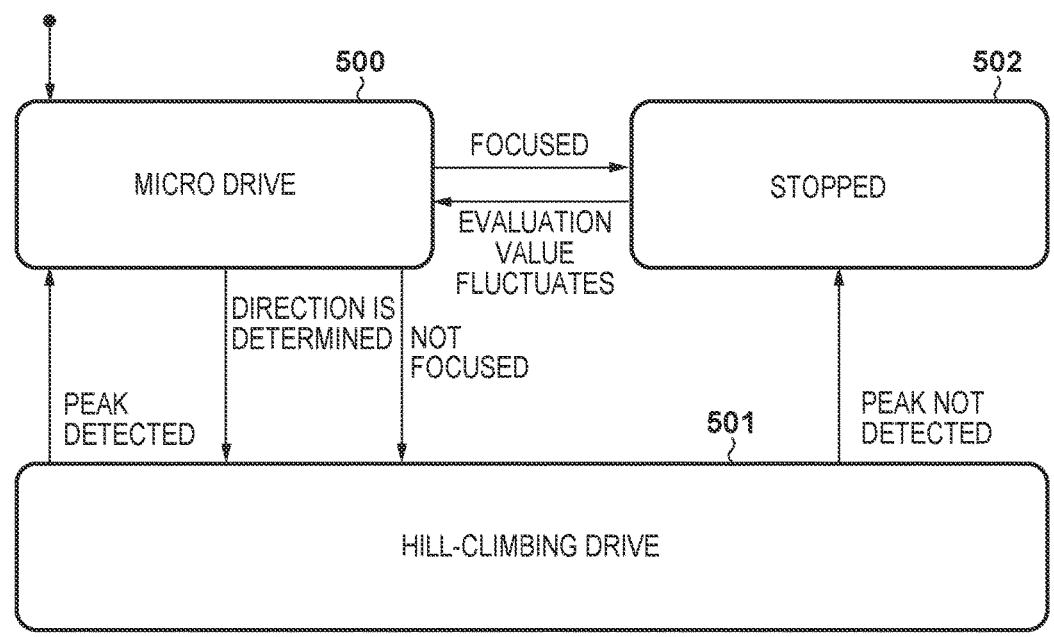
FIG. 5 is a diagram showing state transition of a continuous AF mode.

Next, focus following processing in the continuous AF mode will be described with reference to FIG. 5. FIG. 5 illustrates state transition of the continuous AF mode. States of the continuous AF mode include three states, namely, a micro drive state 500, a hill-climbing drive state 501 and a stopped state 502. When the continuous AF mode is started, transition is performed to the micro drive state 500 as an initial state in fine drive, a reverse operation of the focus lens 103 is performed in the infinity direction and the close-range direction in a narrow range in which focus fluctuation is inconspicuous. If the contrast evaluation value is small, in other words, in the case where the focus position is at the foot of the mountain of the evaluation value, the direction in which the evaluation value increases is determined by performing the reverse operation, and thereby it is possible to determine whether the peak position of the mountain is in the close-range direction or the infinite direction. When the direction of the peak of the mountain is determined in fine drive, transition is performed to the hill-climbing drive state 501. In the hill-climbing drive, the focus lens 103 is moved a large amount toward the direction of the peak of the mountain, and the peak position of the mountain at which the evaluation value starts to decrease after an increase is detected. When the peak position is detected in the hill-climbing drive, transition is performed to the micro drive state 500 again. In fine drive, when the evaluation value is high, in other words, in the case where the focus position is near the peak position of the mountain of the evaluation value, the peak position of the mountain can be obtained even more minutely by determining the change in the evaluation value while performing the reverse operation of the focus lens 103 more finely than in the hill-climbing drive. If the focusing position is detected by fine drive near the peak position of the mountain, transition is performed to the stopped state 502, where the focus lens 103 is stopped, and a focus flag indicating an in-focus state is set ON. In addition, if a precise peak position could not, be detected even by repeating the reverse operation in fine drive a predetermined number of times, the focus lens 103 is moved again a large amount by the hill-climbing drive to detect the peak position. If the peak position of the mountain cannot be detected even if the focus lens 103 is operated in the hill-climbing drive to the infinity end or the close-up end, there is a possibility that the object is out of the range in which the object can be focused. Therefore, in this case, transition is performed to the stopped state 502, where the focus lens 103 is stopped at the infinite end or the close-up end, and the focus flag is set OFF. In the stopped state 502, it is periodically determined whether or not the evaluation value has fluctuated. If the evaluation value fluctuates in the stopped state 502, it is determined that the object has moved, transition is performed to the micro drive state 500 again, and the direction in which the object has moved is determined. In the continuous AF mode, focus can continuously follow a moving object by repeating fine drive, hill-climbing drive and stopping in this manner.

Figure 6A:
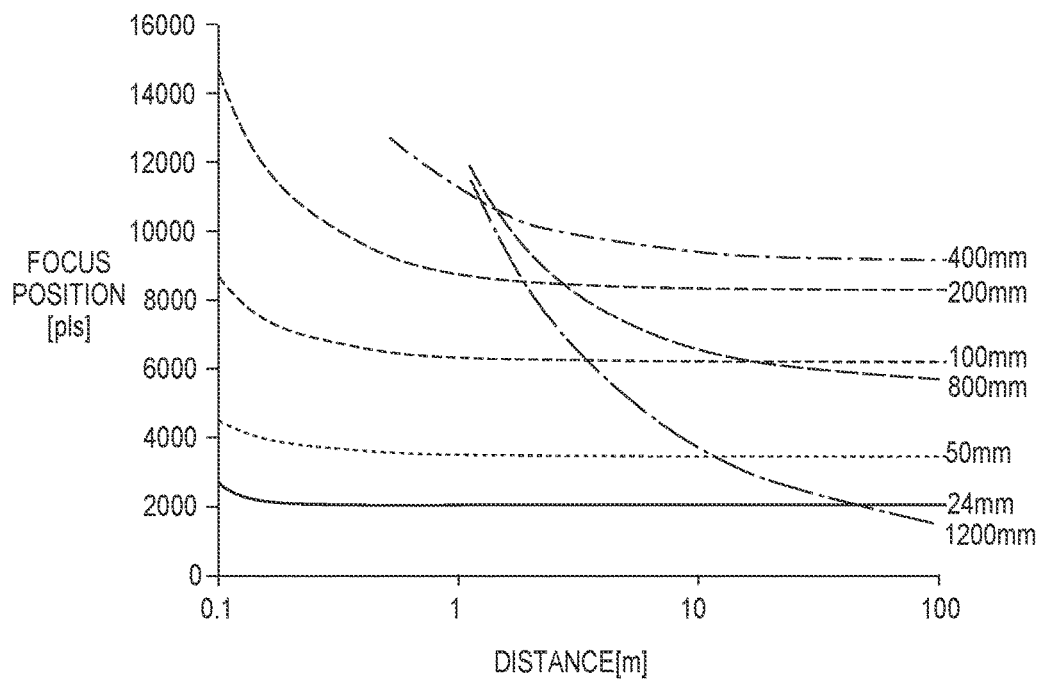
FIGS. 6A and 6B are diagrams illustrating the relationship between an object distance and a focus lens position for each focal length.

Next, a method for acquiring an object distance that is referred to in automatic zooming control and the reliability of the acquired object distance will be described with reference to FIGS. 6A and 6B. FIG. 6A shows the focus cam table shown in FIG. 2 graphed for each specific focal length, as the relationship between the object distance (Distance) and the focus position (Focus Position) at which the object is focused at the object distance. In FIG. 6A, the horizontal axis indicates the object distance based on a logarithmic scale, and the vertical axis indicates the focus position. A numerical value shown beside each of the line graphs is a focal length corresponding to a zoom position. The focus cam table is a data group indicating focus positions corresponding to specific focal lengths and object distances, and is stored in the memory 118. The AF control unit 124 acquires a focus position from the focus lens driving unit 112, and acquires a zoom position from the zoom lens driving unit 113 via the CZ control unit 119. An object distance corresponding to the acquired focus position is searched for with reference to the focus cam table for a focal length corresponding to the acquired zoom position. If the same value as the acquired focus position or zoom position is not included in the focus cam table, the object distance is calculated by performing interpolation calculation using a close value included in the focus cam table. In addition, it becomes possible to more accurately obtain the object distance by obtaining, in advance, a focus position at which an object at a known distance is focused and adjusting data in the focus cam table individually.

Figure 6B:
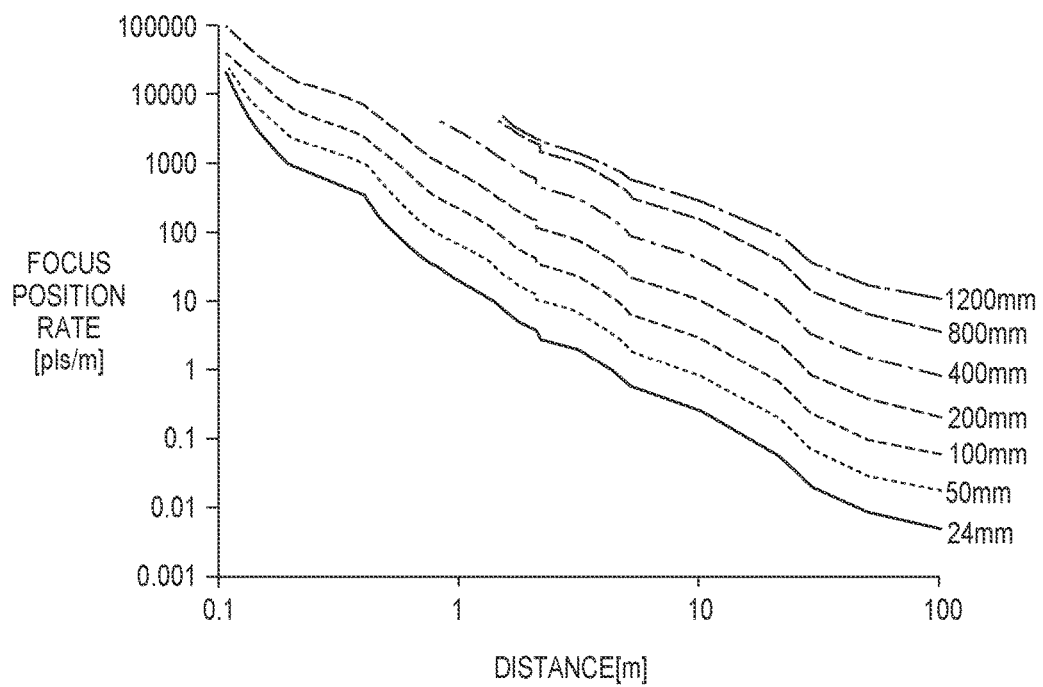

FIG. 6B shows a graph of a focus position at which an object is focused and that is differentiated using an object distance, namely, the inclination (the change amount of the focus position for an object distance of 1 m (hereinafter, referred to as a focus change rate)) of the graph in FIG. 6A. In FIG. 6B, the horizontal axis indicates an object distance based on a logarithmic scale, and the vertical axis indicates a focus change rate relative to the object distance based on a logarithmic scale. A numerical value shown beside each of the line graphs indicates a focal length corresponding to a zoom position. As shown in FIG. 6B, the focus change rate increases as the focal length approaches the telephoto side or the object distance approaches the close range side, and decreases as the focal length approaches the wide angle side or the object distance approaches the infinity side. In a range in which the focus change rate is small, change in focus is small relative to the change in the object distance, and thus there is a possibility that the focus position is not changed by AF control even if the object actually moves. Therefore, it is conceived that the accuracy in obtaining the object distance, namely, reliability, is low in the range in which the focus change rate is small. In view of this, in this embodiment, in the case where automatic zooming is performed in accordance with the change in object distance, automatic zooming is prevented from malfunctioning by not executing automatic zooming that is based on the object distance in a range in which the focus change rate is smaller than a predetermined value.

In addition, the focus change rate is a value that indicates a tendency similar to that of depth of field. Specifically, change in focus is small in a range in which the focus change rate is small even if the object distance changes, indicating that the depth of field is deep. In a range in which the focus change rate is large, the focus changes even due to a slight change in the object distance, indicating that the depth of field is shallow. In general, the depth of field has characteristics of being shallower as the focal length approaches the telephoto side or the object distance approaches the close range side, and being deeper as the focal length approaches the wide angle side or the object distance approaches the infinity side, indicating a tendency similar to that of the focus change rate shown in FIG. 6B. In view of this, instead of the focus change rate, the depth of field may be calculated as the reliability of the object distance, thereby determining whether or not to execute automatic zooming in accordance with the depth of field. The depth of field can be calculated by the following expressions.

Front depth of field=(diameter of permissible circle of confusion×aperture value×object distance$^2$)/ (focal length$^2$+diameter of permissible circle of confusion×aperture value×object distance)

Rear depth of field=(diameter of permissible circle of confusion×aperture value×object)/(focal length$^2$+diameter of permissible circle of confusion×aperture value×object distance)

Depth of field=front depth of field+rear depth of field

Note that the diameter of a permissible circle of confusion is a value determined in accordance with the pixel size of the image sensor 106. Moreover, instead of calculating the depth of field, the focal length, the object distance and the aperture value that are terms constituting the expressions for calculating the depth or field may be individually determined as the reliability of the object distance.

An attitude detection unit 125 detects the attitude of the camera (for example, normal position/grip up/grip down) based on information of an acceleration sensor. A shake detection unit 126 detects a blurred state of the camera based on angular speed information of the gyro sensor and the like by performing determination if a blurring amount (detection value) applied to the gyro sensor or the like is greater than or equal to a predetermined amount (threshold), the shake detection unit 126 determines that the camera is held by a hand, and in the case where the blurring amount is smaller than the predetermined amount, determines that the camera is fixed to a tripod or the like. A configuration may be adopted in which the acceleration sensor and the gyro sensor respectively used for attitude detection und shake detection are used along with a detection sensor for acquiring control information of the stabilization lens driving unit 111.

Next, an overview of the automatic zooming function in this embodiment and the AZ control unit 122 will be described. In a camera that does not have the automatic zooming function, in cases such as those where the object moves and is framed out while the photographer is waiting for a photo opportunity after performing framing in a telephoto state, the following operation was necessary.

First, the photographer performs a zooming out operation using the zoom lever or the like included in the operation unit 117, and then searches for an object. After searching for an object, the photographer performs a zoom operation again until the desired angle of view is acquired, and adjusts the angle of view. Also, in cases such as where the object has moved and thus the size of the object image has changed, the photographer needs to adjust the size of the object image by operating the zoom lever or the like.

On the other hand, in a camera that has an automatic zooming function, it suffices for the photographer to set the automatic zooming function, and then designate an object desired to be shot by performing an operation of designating the object using a touch panel or the like. When the automatic zooming function is set, a zoom operation is automatically performed such that the designated object fits a predetermined size near the center of the image. Note that methods for designating an object includes, is addition to a touch panel operation, a method for designating an object near the center of the screen when the photographer operates a specific button, and a method for automatically selecting a main object from objects detected by the camera.

The object detection unit 123 calculates the position and the size of the designated object region on the image data from the image memory 108. It becomes possible to track the movement of the object by consecutively performing this processing on sampling image data every time the image is displayed as a live view. If the image of the object that is being tracked is detected in a zoom-out region, which will be described later, and in the case where the detected object image is larger than a predetermined size, the AZ control unit 122 starts a zoom-out operation. Specifically, the AZ control unit 122 instructs the CZ control unit 119 or the electronic zooming control unit 120 to perform zooming out in the wide angle direction. If an object is detected in a zoom-in region, and the object image fits within a range of a predetermined size, a zoom-in operation is performed to the telephoto side. With such processing, it suffices for the photographer only to move the camera so as to fit the image of a desired object within the screen without considering a zoom operation. Even in the case where the object is about to be framed out, the zoom magnification is automatically changed, and thus the angle of view can be adjusted more easily.

Conditions for Determining to Start Zoom Operation

Next, conditions for determining to start a zoom-out operation and a zoom-in operation will be described with reference to FIGS. 7A to 10F. FIGS. 7A and 7B show processing for preventing an object other than a person from being framed out of the screen. FIGS. 8A to 8C show processing for preventing a person from being framed out of the screen.

In FIGS. 7A to 8C, a frame 700a and a frame 700b are first tracking frames (hereinafter, referred to as entity tracking frames) for tracking an object other than a person (entity), and frames 800a to 800f are second tracking frames (hereinafter, referred to as face tracking frames) for tracking an object (a face of a person). Hereinafter, in the case where an object is applicable to both a face of a person and a body other than a face of a person, an entity tracking frame and a face tracking frame may be referred to as object tracking frames collectively. An object tracking frame is displayed so as to surround an object image on the EVF screen of the display unit 109, such that the object designated by the photographer can be distinguished. The position and the size of the object tracking frame on the screen is calculated by the tracking unit 301 of the object detection unit 123 based on face information and color information, and is updated at the frame rate cycle.

Processing for preventing an object (airplane) from being framed out of the screen will be described with reference to FIGS. 7A and 7B. In FIG. 7A, the zoom-out (ZO) region indicates a region that is outside the entire angle of view (the entire screen) displayed on the EVF screen, by more than a predetermined ratio. For example, the case where the central point of the screen is set as 0%, the entire screen is set as 100%, and positions at which 80% of the entire screen is defined form a boundary of the ZO region is envisioned in this case, a region that is 80 to 100% of the entire screen serves as the ZO region. When a portion of the entity tracking frame 700a enters the ZO region, the AZ control unit 122 performs control so as to start a zoom-out operation. The AZ control unit 122 also stores, in the memory 118, the zoom magnification before the zoom movement (equivalent to a zoom-in angle of view). The target zoom magnification and zooming speed during the zoom-out operation are set in advance in accordance with the size and the moving speed of the object image. In addition, the target zoom magnification and zooming speed may be calculated in accordance with the size and the moving speed of the object image as appropriate. A zoom-out operation is executed in accordance with the target zoom magnification and the zooming speed. Accordingly, frame-out of the object can be effectively prevented.

FIG. 7B shows an angle of view when a zoom-out operation equivalent to a predetermined zoom change amount is performed from the angle of view in FIG. 7A. The zoom-in (ZI) region shown in FIG. 7B indicates a region within a zoom-in angle of view (angle of view before zooming out) 701 by more than the predetermined ratio in an object searching state. For example, the case where the central point of the screen is set as 0%, the zoom-in angle of view 701 is set as 100%, and positions at which 70% of the zoom-in angle of view 701 is defined form a boundary of the ZI region is envisioned. In this case, a region that is 0 to 70% of the entire zoom-in angle of view 701 serves as the ZI region. At this time, for example, if the zoom-out magnification is ½, the size of the zoom-in angle of view 701 is 50% of the entire screen. Therefore, it can be said that the boundary of the ZI region is 70%×(½)=35% of the entire screen, and the ZI region is a region that is 0 to 35% of the entire screen. When the photographer changes the attitude of the camera such that the entity tracking frame 700b fits within the ZI region, the AZ control unit 122 performs control so as to start a zoom-in operation.

Next, frame-out prevention control for preventing an object (person) from being framed out of the screen in a zoom operation of this embodiment will be described with reference to FIGS. 8A to 8C. If the object is a face of a person, when a portion of the face tracking frame enters the ZO region, a zoom-out operation starts, and when the face tracking frame fits within the ZI region, a zoom-in operation is performed. If the object is a face of a person, unlike the case of a body other than a face of a person, the direction of movement of the object can be predicted to some extent, and thus the ZO region and the ZI region are set in accordance with a region in the direction of the movement that is predicted. In addition, in handheld shooting, the object may be framed out due to the influence of camera shake and the like. However, in the case where the object is framed out due to camera shake or the like, the object can be framed in again by the photographer performing an operation of attempting to frame in the object. Here, in the case where the ZO region is set in an upper portion of the screen, even when a shot is taken with a person arranged near the center, the face tracking frame may enter the ZO region, unintentionally causing zooming out. In view of this, in the case where the object is a face of a person and the camera is handheld (in the state where the photographer is holding the camera), the ZO region is not set in an upper portion of the screen in consideration of a framing operation by the photographer.

In this manner, in this embodiment, in the case where a face is detected by the object detection unit 123, the AZ control unit 122 changes the ZO region and the ZI region in accordance with the attitude and the shake state of the camera. The attitude (e.g., a vertical position and a horizontal (normal) position) of the camera is detected by the attitude detection unit 125, and in addition, the shake state of the camera is determined from a result of detection by the shake detection unit 126. The result of detection by the shake detection unit 126 is information indicating whether or not the camera is held by a hand. Processing for setting a zoom-out region and a zoom-in region according to this embodiment will be described specifically below with reference to FIGS. 8A to 8C.

FIG. 8A shows ZO regions and a ZI region that are set when the photographer holds the camera by hand in a normal position. In such a shooting scene, in the case where the object moves in the horizontal direction and is framed out, the position of the object in the screen moves in the horizontal direction (longer side direction) for the screen in the normal position. Accordingly, both the ZO regions and the ZI region are arranged in a form of a longitudinal band in the vertical direction (short-side direction) for the screen at the normal position. The ZO regions are set in a form of a longitudinal band positioned at the two ends of the laterally long rectangular screen in the horizontal direction, and the ZI region is set in a form of a longitudinal band positioned at a center portion of the screen in this case, when the face tracking frame 800a enters the ZO region, the AZ control unit 122 determines to start zooming out, and performs a zoom-out operation corresponding to a predetermined zoom magnification. In addition, when the face tracking frame 800b is included in the ZI region, the AZ control unit 122 determines to start zooming in, and performs a zoom-in operation corresponding to the predetermined zoom magnification to a zoom return position. Object (person) frame-out can be effectively prevented by setting the ZO regions and the ZI region in this manner.

FIG. 8B shows ZO regions and a ZI region that are set when the camera attitude is chanced in a shooting scene similar to that in FIG. 8A, and the photographer holds the camera in a vertical position state, namely, grp up or grip down. In this case, the ZO regions and the ZI region are arranged in a form of a longitudinal band in the vertical direction (longer side direction) for the screen in the vertical position. Specifically, the ZO regions are set in a form of a longitudinal band positioned at the two ends of the vertically-long rectangular screen in the horizontal direction, and the ZI region is set in a form of a longitudinal band positioned in the center portion of the screen. In this case, when the face tracking frame 800c enters the ZO region, the AZ control unit 122 determines to start zooming out, and performs a zoom-out operation corresponding to a predetermined zoom magnification. In addition, when the face tracking frame 800d is included in the ZI region, the AZ control unit 122 determines to start zooming in, and performs a zoom-in operation corresponding to the predetermined zoom magnification to the zoom return position. If the ZO regions and the ZI region are set in this manner, the movement of the object in the horizontal direction is detected, and frame-out can be effectively prevented.

FIG. 8C shows a ZO region and a ZI region that are set when the detection state of the shake detection unit 126 is a fixed state. The fixed state is a state where the camera is fixed by a tripod or the like, and there is no possibility of frame-out due to camera shake. Furthermore, if a zoom-in operation is performed when the object is not framed in near the center of the screen, there is a possibility of frame-out. In view of this, the ZO region is set around the entire peripheral portion of the screen, and the ZI region is set inside the zoom-in angle of view. Specifically, the ZO region is set in a form of a rectangular band positioned at the ends of the screen in the vertical direction and the horizontal direction, and the ZI region is set as a rectangle positioned in a center portion of the screen. In this case, when the face tracking frame 800e enters the ZO region, the AZ control unit 122 determines to start a zoom-out operation, and performs a zoom-out operation corresponding to a predetermined zoom magnification. Moreover, when the face tracking frame 800f is included in the ZI region, the AZ control unit 122 determines to start a zoom-in operation, and performs a zoom-in operation corresponding to the predetermined zoom magnification, to the zoom return position.

As described above, according to this embodiment, the ranges of the ZO region and the ZI region are dynamically changed in accordance with change in the attitude of the camera (vertical position/normal position) and change in shooting state (hand-held state/fixed state), and thus frame-out of the object can be effectively prevented while preventing a malfunction due to camera shake and the like. Note that the ZO region and the ZI region may be changed in accordance with either the attitude of the camera (vertical positon/normal position) or the shooting state (hand-held state/fixed state), and only one of the ZO region and the ZI region may be changed.

Next, size maintaining control for maintaining the ratio of an object image to the screen within a predetermined range during a zoom operation of this embodiment will be described with reference to FIGS. 9A to 10F.

In this embodiment, control (size maintaining control) is performed so as to maintain the size of an object image within the predetermined range from a reference size by automatically performing a zoom operation in the case where the size of the detected object image has changed by more than a predetermined number of times the reference size. FIGS. 9A to 9F show control for maintaining the size of an object that is a person, and FIGS. 10A to 10F show control for maintaining the size of an object other than a person.

First, a zoom operation related to control for maintaining the of an object that is a person will be described with reference to FIGS. 9A to 9F. FIGS. 9A to 9C show a zoom operation automatically performed by the camera in the case where the object (person) approaches the camera. This is a zoom-out operation for keeping the ratio of the object image to the screen within the predetermined ratio. Note that in FIGS. 9A to 9F, face tracking frames 900a to 900f are displayed so as to surround the face region as a characteristic region of the person that is the object. Therefore, the size of the face tracking frame will be described below as the size of the object.

FIG. 9A shows arm angle of view when the object is designated in accordance with the object designating method, which will be described later. When designating the object, the face tracking frame 900a is determined based on the size of the designated object, and the size of the face tracking frame 900a is stored as a reference object size (reference size) in the memory 118. FIG. 9B shows an angle of view when the object approaches the camera in the state where the zoom magnification is not changed from the state in FIG. 9A. For example, a size that is 150% of the size of the face tracking frame 900a that is the reference object size serves as a size when a zoom-out operation is started. When the relationship between object tracking frames (face tracking frames) becomes "face tracking frame 900b>face tracking frame 900a×150%", in other words, when the tracking frame changes by more than a predetermined change amount relative to the reference size, the AZ control unit 122 determines to start a zoom-out operation.

FIG. 9C shows an angle of view zoomed out by a predetermined zoom magnification from the angle of view in FIG. 9B, and the face tracking frame 900c. Here, the predetermined zoom magnification is set to 1/1.5 in consideration of the change rate (1.5%) of the face tracking frame size when a zoom-out operation is started, relative to the reference object size. After that, in the case where the object further approaches the camera, the object image can be continuously kept within the predetermined ratio by further performing zooming out to the wide angle side. Therefore, the photographer is able to concentrate only on the operation of the release switch.

On the other hand, FIGS. 9D to 9F show a zoom operation automatically performed by the camera in the case where the person that is the object moves away from the camera. This is a zoom-in operation for keeping the ratio of the object image to the screen within the predetermined range. FIG. 9D shows an angle of view when the object is designated in accordance with the object designating method, which will be described later. The size of the face tracking frame 900*d* when the object is designated is stored as a reference object size in the memory 118.

FIG. 9E shows an angle of view when the object moves away from the camera in the state where the zoom magnification is not changed from the state in FIG. 9D. For example, a size that is 50% of the size of the face tracking frame 900*d* that is the reference object size serves as a size when a zoom-in operation is started. When the relationship between face tracking frames becomes "face tracking frame 900*e*<face tracking frame 900*d*×50%", it is determined that the tracking frames have changed by more than a predetermined change amount relative to the reference size. When this determination condition is satisfied, and the face tracking frame 900*e* is included in the ZI region, the AZ control unit 122 determines to start a zoom-in operation. Here, the ZI region is set within an angle of view zoomed in by a predetermined zoom magnification relative to the angle of view in FIG. 9E.

FIG. 9F shows the angle of view zoomed in by the predetermined zoom magnification from the angle of view in FIG. 9E, and the face tracking frame 900*f*. Here, the predetermined zoom magnification is set to 1/0.5 in consideration of the change rate (50%) of the face tracking frame size when a zoom-in operation is started, relative to the reference object size.

Next, a zoom operation related to control for maintaining the size of an object other than a person will be described with reference to FIGS. 10A to 10F. If the object is a body (airplane) other than a face of a person, a region of the same color is detected as the size of the object, and thus a detection error is greater than a face region in the case where the object is a face of a person. Accordingly, in this embodiment, the accuracy of automatic zooming control is increased by using the object distance acquired with the AF control unit 124 in addition as the condition for determining to start a zoom operation. The relationship between the object distance and the object size is an inversely proportional relationship. For example, in the case where an object at a distance of 10 m from the digital camera 100 approaches half the distance to a distance of 5 m, the object size changes by approximately twice. Therefore, the ratio of the object to the screen can be kept within the predetermined range by changing the zoom magnification by the inverse number of the change magnification of the object size, namely, the change magnification of the object distance. Size maintaining control by a zoom operation of this embodiment will be described specifically below with reference to FIGS. 10A to 10F. Note that a zoom operation that is based on the object size is similar to the case where the object is a face of a person, and thus description thereof is omitted.

FIGS. 10A to 10C show a zoom operation automatically performed y the camera in the case where an object. (airplane) approaches the camera. This is a zoom-out operation for keeping the ratio of the object image to the screen within a predetermined ratio. Note that in FIGS. 10A to 10F, entity tracking frames 1000*a* to 1000*f* are displayed so as to surround the body region as a characteristic region of the airplane that is the object.

FIG. 10A shows an angle of view when the object is designated by the object designating method, which will be described later. When the object is designated, the distance to the designated object is acquired by the AF control unit 124, and the acquired object distance is determined as a reference object distance (reference distance), and is stored in the memory 118. FIG. 10B shows an angle of view when the object approaches the camera in the state where the zoom magnification is not changed from the state in FIG. 10A. For example, a distance that is ½ of the reference object distance serves as a distance when a zoom-out operation is started. When the relationship of the object distance acquired by the AF control unit 124 becomes "object distance<reference distance/2", the AZ control unit 122 determines to start a zoom-out operation.

FIG. 10C shows an angle of view zoomed out by a predetermined zoom magnification from the angle of view in FIG. 10B, and the entity tracking frame 1000*c*. Here, the predetermined zoom magnification is set to ½ in consideration of the change rate (½ times) when a zoom-out operation is started, relative to the reference distance. After that, in the case where the object further approaches the camera, the object image can be continuously kept within the predetermined ratio by further performing zooming out to the wide angle side. Therefore, the photographer is able to concentrate only on the operation of the release switch.

On the other hand, FIGS. 10D to 10F show a zoom operation automatically performed by the camera in the case where the airplane that is the object moves away from the camera. This is a zoom-in operation for keeping the ratio of the object image to the screen within the predetermined range. FIG. 10D shows an angle of view when the object is designated in accordance with the object designating method, which will be described later. The object distance when the object is designated is stored as a reference object distance in the memory 118.

FIG. 10E shows an angle of view when the object moves away from the camera if the zoom magnification is not changed from the state in FIG. 10D. For example, a distance that is twice the reference object distance serves as a size when a zoom-in operation is started. When the relationship of the object distance acquired by the AF control unit 124 becomes "object distance>reference distance×2", it is determined that the distance has changed by more than a predetermined change amount relative to the reference distance. When this determination condition is satisfied, and the entity tracking frame 1000*e* is included in the ZI region, the AZ control unit 122 determines to start a zoom-in operation. Here, the ZI region is set inside the angle of view zoomed in by a predetermined zoom magnification relative to the angle of view in FIG. 10E.

FIG. 10F shows the angle of view zoomed in by the predetermined zoom magnification from the angle of view in FIG. 10E, and the entity tracking frame 1000*f*. Here, the predetermined zoom magnification is set to 2 times in consideration of the change rate (2 times) of the object distance when a zoom-in operation is started, relative to the reference distance.

As described above, according to this embodiment, in the case where the object is not a face of a person, the size on the screen can be maintained regarding one of or both the object distance and the object by changing the zoom magnification in accordance with the changed magnification.

Processing Procedure of Automatic Zooming Control

Next, the processing procedure of automatic zooming control of this embodiment will be described with reference to the flowcharts in FIGS. 11 to 17B. Note that the processing in FIGS. 11 to 17B is realized by the system control unit 114 executing a control program read out from the memory 118. In addition, the automatic zooming function of this embodiment is realized by the system control unit 114 (the AZ control unit 122) controlling the constituent elements based on control instructions, unless explicitly stated otherwise.

Figure 11:
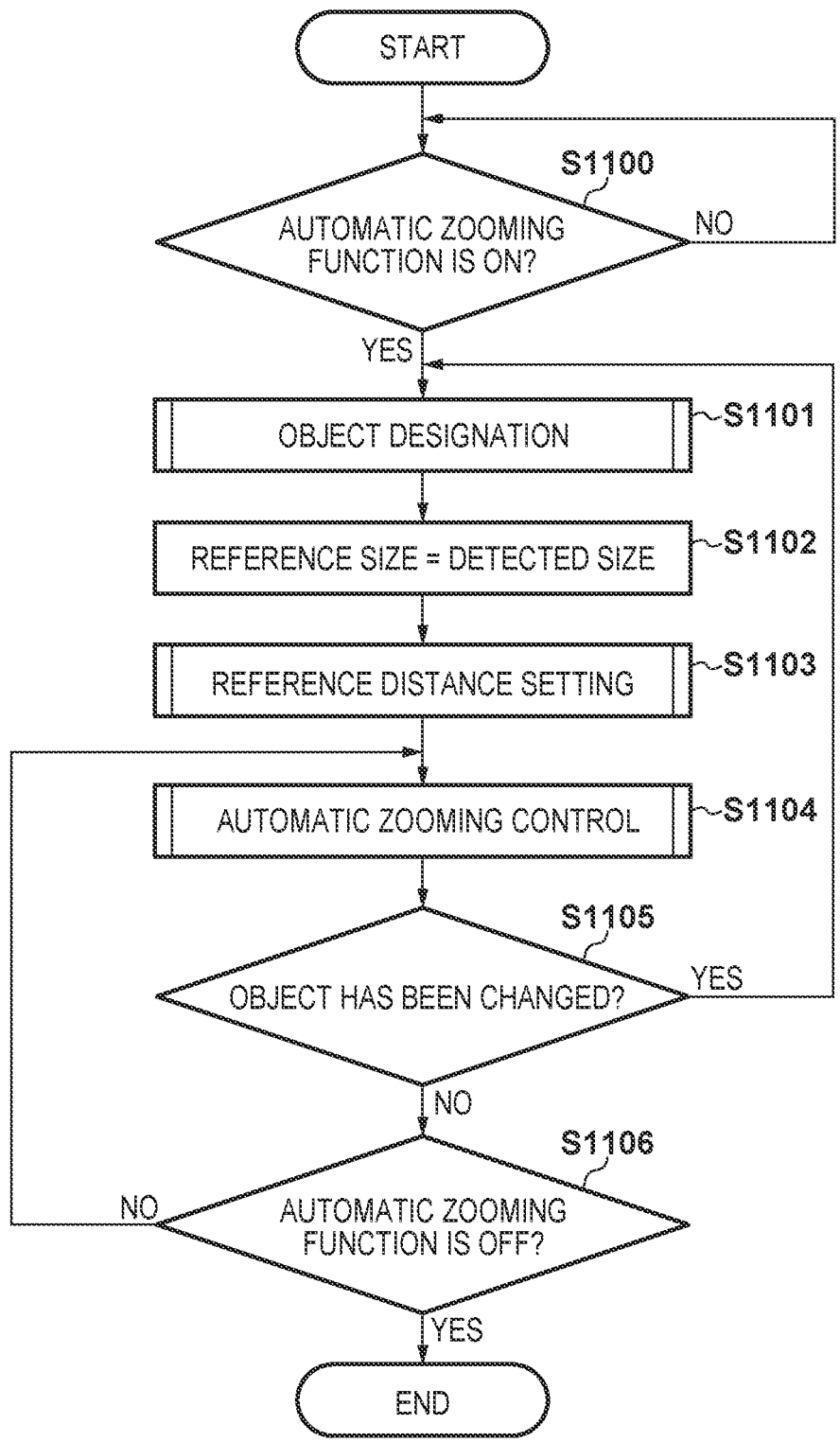
FIG. 11 is a flowchart showing a processing procedure of automatic zooming control of a first embodiment.

First, the processing procedure of overall automatic zooming control will be described with reference to FIG. 11.

In step S1100, the AZ control unit 122 waits for the automatic zooming function to be set ON while monitoring the operation state of the automatic zooming switch included in the operation unit 117, and when the automatic zooming function is set ON, the procedure advances to step S1101. After that, the AZ control unit 122 sequentially executes object designating processing (step S1101), reference size setting processing (step S1102), reference distance setting processing (step S1103) and automatic zooming control (step S1104).

When the process rig of steps S1101 to S1104 ends, the procedure advances to step S1105. In step S1105, the AZ control unit 122 determines whether or not the object that is being tracked has been changed. If the object that is being tracked has been changed, the procedure returns to step S1101, and in the case where the object that is being tracked has been not changed, the procedure advances to step S1106.

In step S1106, the AZ control unit 122 determines whether or not the automatic zooming function has been set. ON while monitoring the operation state of the automatic zooming switch included in the operation unit 117 if the automatic zooming function has not been set ON, the processing ends, and if the automatic zooming function has been set ON, the procedure returns to step S1104, where automatic zooming control is continued.

Object Specifying Processing

Figure 12A:
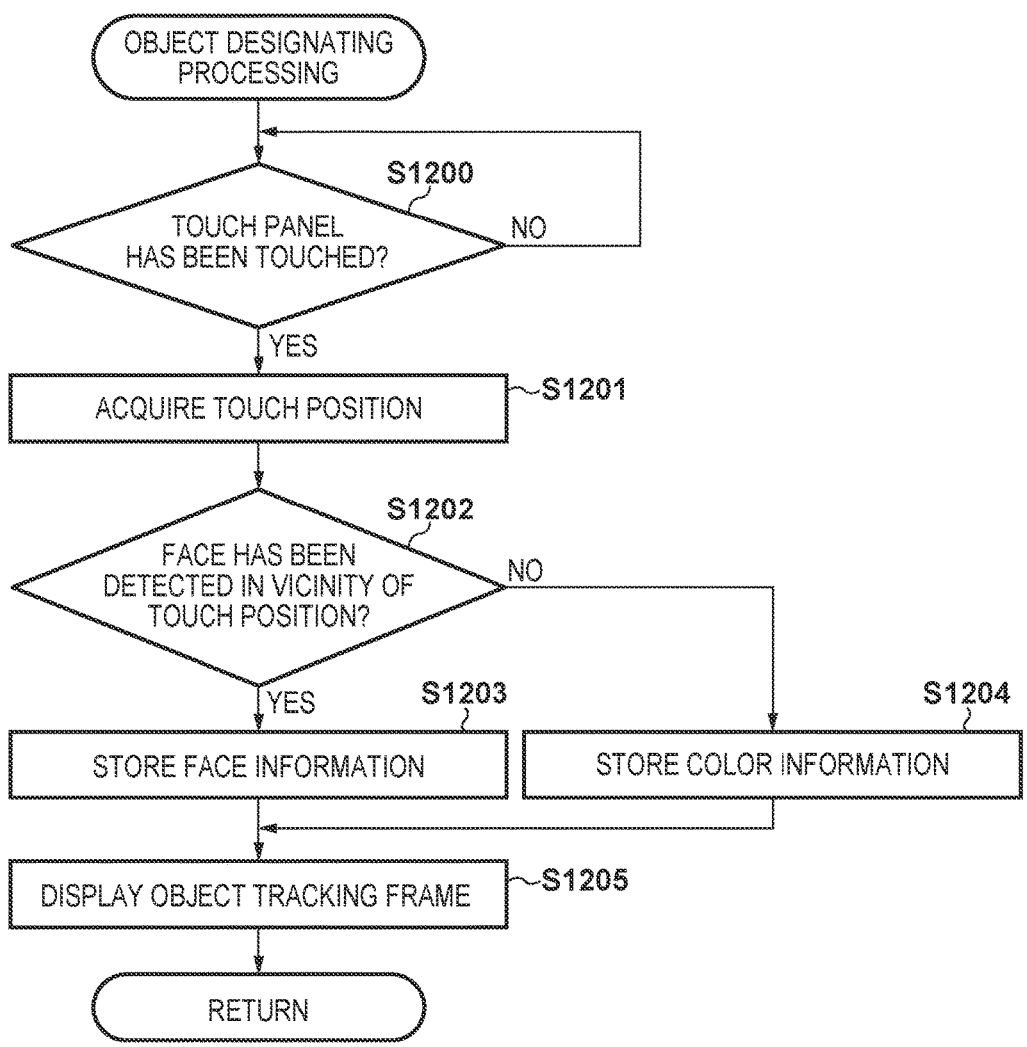
FIGS. 12A to 12C are flowcharts showing detailed object designating processing in FIG. 11.

Here, the object designating processing in step S1102 will be described with reference to FIG. 12. FIG. 12A shows processing for the photographer designating a desired object using the touch panel included in the operation unit 117. In this embodiment, it is assumed that the photographer performs a designating operation by touching an object image displayed on the display unit 109. In step S1200, the AZ control unit 122 determines whether or not the touch panel has been touched. If the touch panel has been touched, the procedure advances to step S1201, and if the touch panel has not been touched, determination processing is repeated until the touch panel is touched. In step S1201, the AZ control unit 122 acquires information regarding the position (touch position) that the photographer touched. In step S1202, the AZ control unit 122 notifies the object detection unit 123 of the touch position, and the object detection unit 123 performs face detection in the vicinity of the touch position. If a face is detected in the vicinity of the touch position in step S1202, the AZ control unit 122 determines that the main object is a person, and the procedure advances to step S1203. In addition, if a face is not detected near the touch position in step S1202, the AZ control unit 122 determines that the main object is a body other than a person, and the procedure advances to step S1204.

In step S1203, the AZ control unit 122 stores, in the memory 118, face information of the person that is to be subjected to automatic tracking. Such face information includes information such as the size of the face and the face detection position when the object is designated and the attitude of the face. In addition, in a camera that has a face authentication function, identification information such as an authentication ID is also stored in the memory 118.

In step S1204, the AZ control unit 122 stores, in the memory 118, characteristic colors in the vicinity of the touch position as color information to be subjected to automatic tracking. Such color information includes characteristic colors and the luminance thereof when the object is designated, the value of color difference, the size of regions of the same color, and the centroid position of the region of the same color. In addition, in a camera that has an entity authentication function, identification information such as an authentication ID is also stored in the memory 118. Hereinafter, face information and color information are also referred to collectively as object information (including the position and the size of the object).

In step S1205, the AZ control unit 122 displays an object tracking frame. Specifically, the AZ control unit 122 causes the display unit 109 to display an object tracking frame (an entity tracking frame or a face tracking frame) whose size corresponds to the object size, centered on the object detection position, and object designating processing ends.

Figure 12B:
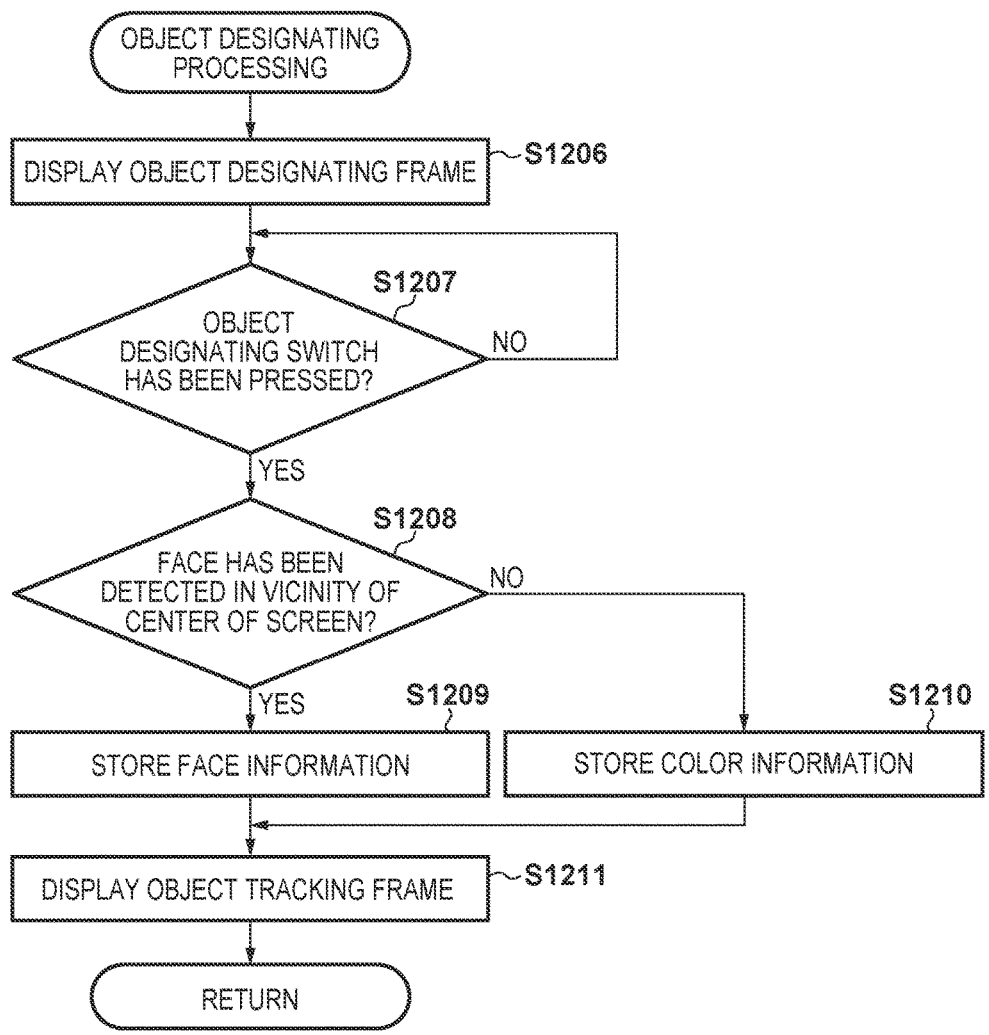

In this manner, in the system control unit 114, the object detection unit 123 detects an object in the display unit 109 at a position designated by the photographer or in the vicinity of the designated position. The AZ control unit 122 then displays an object tracking frame on the display unit 109. According to the processing in FIG. 12A, the photographer can designate an object that he or she wants to track, easily by an intuitive method. Note that the object designating method is not limited to the above-described method. FIG. 12B shows processing if the photographer designates an object using a switch (an object designating switch) other than the automatic zooming switch as an operation member that constitutes the operation unit 117, as a designating method other than that in FIG. 12A, 12A.

In step S1206, the AZ control unit 122 displays, in the vicinity of the center of the screen of the display unit 109, an object designating frame serving as a guide for designating an object. The photographer adjusts the attitude of the camera using this object designating frame as a guide, such that an object image desired to be tracked is included in the vicinity of the center of the screen.

In step S1207, the AZ control unit 122 determines whether or not the object designating switch has been pressed. If the object designating switch has been pressed, the procedure advances to step S1208, and if the switch has not been pressed, determination processing is repeated until the switch is pressed.

In step S1208, the object detection unit 123 performs face detection near the center of the screen. If a face is detected, the AZ control unit 122 determines that the main object is a person, and the procedure advances to step S1209. On the other hand, if a face is not detected, the AZ control unit 122 determines that the main object is a body other than a person, and the procedure advances to step S1210.

In steps S1209 to S1211 in FIG. 12B, processing similar to the processing of steps S1203 to S1205 in FIG. 12A is performed.

In this manner, in the processing in FIG. 12B, the object detection unit 123 detects an object at the center position of the screen or in the vicinity of the center position of the screen of the display unit 109. The AZ control unit 122 displays, on the display unit 109, an object tracking frame indicating the position of the object. Even with a camera that is not equipped with an operation device such as a touch panel, the photographer can easily designate an object.

Figure 12C:
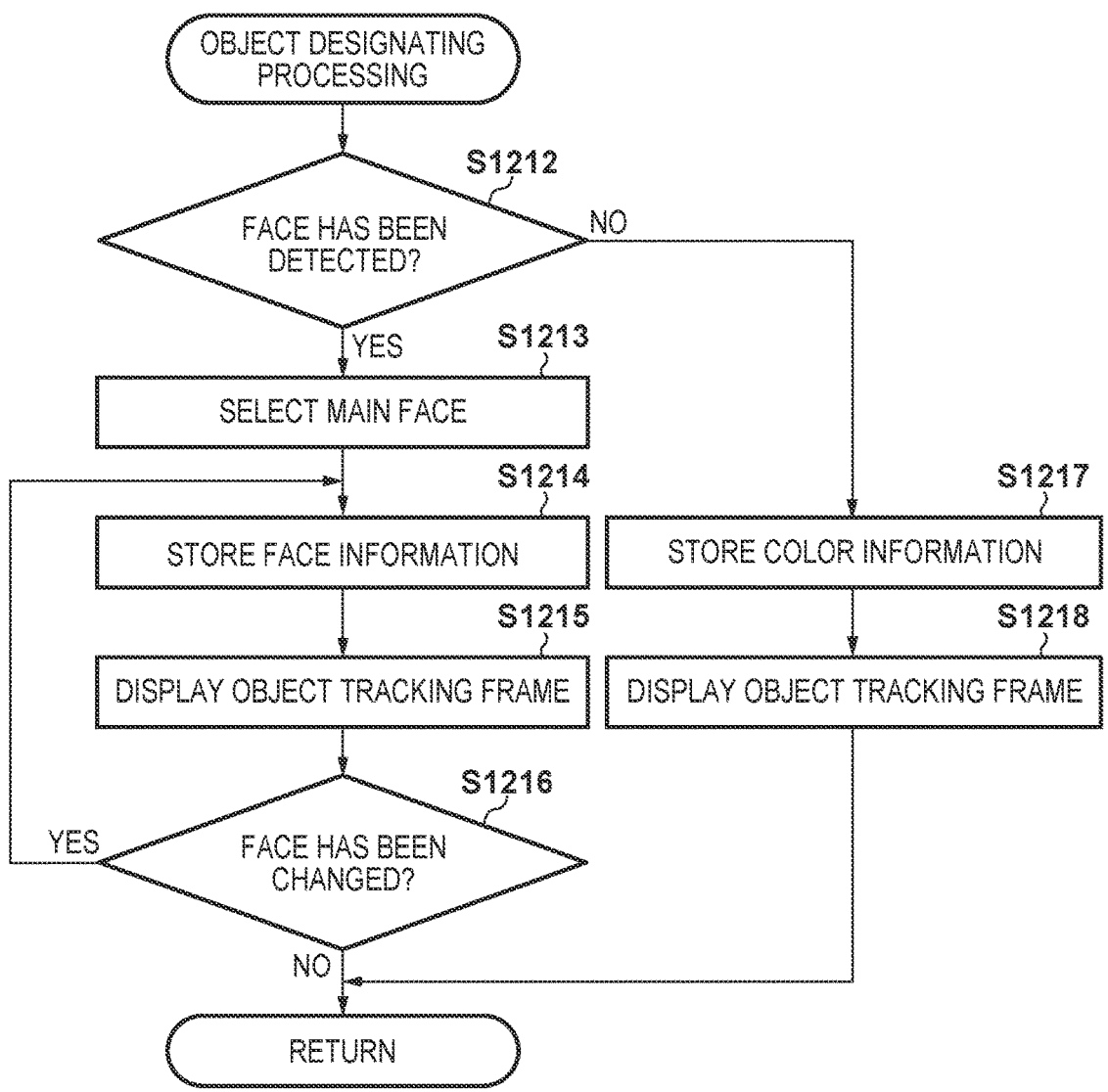

FIG. 12C shows processing for automatically selecting an object to be tracked from faces detected when the automatic zooming switch included in the operation unit. 117 was pressed, as a method other than that described with reference to FIG. 12A.

In step S1212, the object detection unit 123 performs face detection on the entire screen, and determines whether or not a face of a person has been detected. If even a single face is detected in the entire screen, the object detection unit 123 determines that the main object is a person, and the procedure advances to step S1213. In addition, if not a face is detected in the screen, the object detection unit 123 advances the procedure to step S1217.

If a face of a single person has been detected, the object detection unit 123 selects the face as a main face in step S1213. If a plurality of faces have been detected, the object detection unit 123 selects, from those faces, a main face that is an object to be tracked. For example, there is a method for preferentially selecting a face whose face detection position is closer to the center position of the screen, as a determination reference for selecting a main face. In addition, there is a method for selecting a face whose size is larger as a main face if a plurality of faces exist at positions that are similar distances from the center of the screen. Moreover, in the case of a camera that has a face authentication function, there is a method in which, if there is a face registered for authentication, the face is preferentially set as a main face.

In step S1214, similarly to step S1203, the AZ control unit 122 stores face information of the selected main face in the memory 118, and the procedure advances to step S1215. In step S1215, the AZ control unit 122 displays a face tracking frame on the screen similarly to step S1205. In step S1216, the AZ control unit 122 performs face change determination. Specifically, if a plurality of faces have been detected, the automatically selected main face is not necessarily a face intended by the photographer. Therefore, the photographer can change the main face. At this time, when the photographer designates a desired face by pressing the operation unit 117 (the automatic zooming switch or the like), processing for the face tracking frame changing the main face to another face that has not been selected as a main face from detected faces is performed. If the main face is changed in step S1216, the procedure returns to step S1214, where the AZ control unit 122 updates face information to be stored in the memory 118, and in step S1215, the face tracking frame is changed to the size and the detection position of the newly selected main face.

On the other hand, if the procedure has advanced from step S1212 to step S1217, the object detection unit 123 determines that the main object is a body other than a person, and the AZ control unit 122 stores, in the memory 118, a characteristic color in the vicinity of the center of the screen as color information to be subjected to automatic tracking, similarly to step S1204. In step S1218, the AZ control unit 122 displays an entity tracking frame on the screen similarly to step S1205, and ends the processing.

In this manner, in the processing in FIG. 12C, the object detection unit 123 of the system control unit 114 performs face detection on the entire screen of the display unit 109. If a plurality of faces has been detected, the AZ control unit 122 displays, on the display unit 109, an object tracking frame indicating the position of a first face as an object out of the faces. In addition, if the object has been changed from the first face to a second face, the AZ control unit 122 displays an object tracking frame indicating the position of the second face on the display unit 109. Accordingly, the photographer can easily designate a desired object by performing the operations a fewer number of times.

Note that regarding object designating processing, if the camera is provided with both the touch panel and the object designating switch included in the operation unit 117, both the method in FIG. 12A and the method in FIG. 12B may be applied at the same time. Moreover, object designating processing to be applied may be changed in accordance with the processing flow.

Reference Distance Setting Processing

Next, reference distance setting processing of step S1103 will be described with reference to FIG. 13.

The AZ control unit 122 stores the object distance to the object designated by performing object designating processing in step S1102 in FIG. 11, as a reference distance in the memory 118, and refers to the reference distance in automatic zooming control, which will be described later.

In step S1300, the AZ control unit 122 determines whether or not the object designated in object designating processing is a face of a person. If it is determined in step S1300 that the object is a face of a person, the processing ends. If the object is a face of a person, the reliability of the detected size of the face region is relatively high, and thus the AZ control unit 122 executes automatic zooming control based only on the object size without referring to information regarding the object distance. If it is determined in step S1300 that the object is a body, the procedure advances to step S1301. If the object is a body other than a face of a person, the AZ control unit 122 uses information regarding both the object size and the object distance of a characteristic color region to execute automatic zooming control.

In step S1301, the AZ control unit 122 determines whether or not the focus flag is ON, namely, the object is focused, with an AF control state in the continuous AF mode by the AF control unit 124 being the stopped state 502 in FIG. 5. If the object is not focused on, the AZ control unit 122 repeats determination processing until the object is focused by AF control, and if it is determined that the object is focused, the procedure advances to step S1302.

In step S1302, the AZ control unit 122 determines whether or not the focus change rate is greater than or equal to a predetermined value. As a method for calculating the focus change rate, the AF control unit 124 acquires the object distance from the focus position in an in-focus state and the focal length corresponding to the zoom position with reference to the focus cam table shown in FIG. 6A. Furthermore, in relevant focal length data in the focus cam table shown in FIG. 6A, the inclination near the acquired object distance is calculated and is set as the focus change rate. If the calculated focus change rate is smaller than the predetermined value, the reliability of the acquired object distance is low, and thus the AZ control unit 122 ends the processing without storing the object distance as a reference distance in the memory 118, and if the focus change rate is greater than or equal to the predetermined value, the procedure advances to step S1303.

In step S1303, the AZ control unit 122 stores the acquired object distance as a reference distance in the memory 118, and ends the processing.

Automatic Zooming Control

Next, the automatic zooming control of step S1104 in FIG. 11 will be described with reference to FIG. 14.

In step S1400, the AZ control unit 122 determines whether or not the object detection unit 123 has detected an object. If an object has not been detected, the processing ends, and if an object has been detected, the procedure advances to step S1401.

In step S1401, the 2 control unit 122 determines whether or not the object detected in step S1400 is a face of a person. If it is determined that the object is a face of a person, the procedure advances to step S1403, and if it is determined that the object is a body, the procedure advances to step S1402.

In step S1402, the object is a body, and thus the AZ control unit 122 determines the probability as a region of an object to be subjected to automatic zooming control, based on the characteristic color of the object detected by the object detection unit 123. The object detection unit 123 calculates object Likelihood that indicates the probability of the detected characteristic color as an object. The object likelihood is calculated based on the difference between the characteristic color of the designated object stored in the memory 118 in steps S1204, S1210 and S1217 in FIG. 12A to 12C and the detected characteristic color, whether or not a similar characteristic color exists in the image, color distribution in the entire image (whether or not the object color and the background color can be distinguished), and the like. If the object likelihood is smaller than a predetermined value, the AZ control unit 122 ends the automatic zooming control in order to prevent a malfunction due to the reliability of the position and the size of the detected object being low. In this case, the display unit 109 may display notification that automatic zooming control cannot be executed. For example, if an icon displays that the automatic zooming function is ON, a method for graying out the color of the icon, a method for graying out the color of the entity tracking frame, a method for displaying the text "object cannot be detected." or the like may be applied, for example. In addition, if the object likelihood is greater than or equal to the predetermined value, the procedure advances to step 1403. Specifically, if it is determined that the object is a face of a person or a body for which the re lability of object detection is high, frame-out prevention control is executed in step S1403.

Frame-Out Prevention Control

Figure 15:
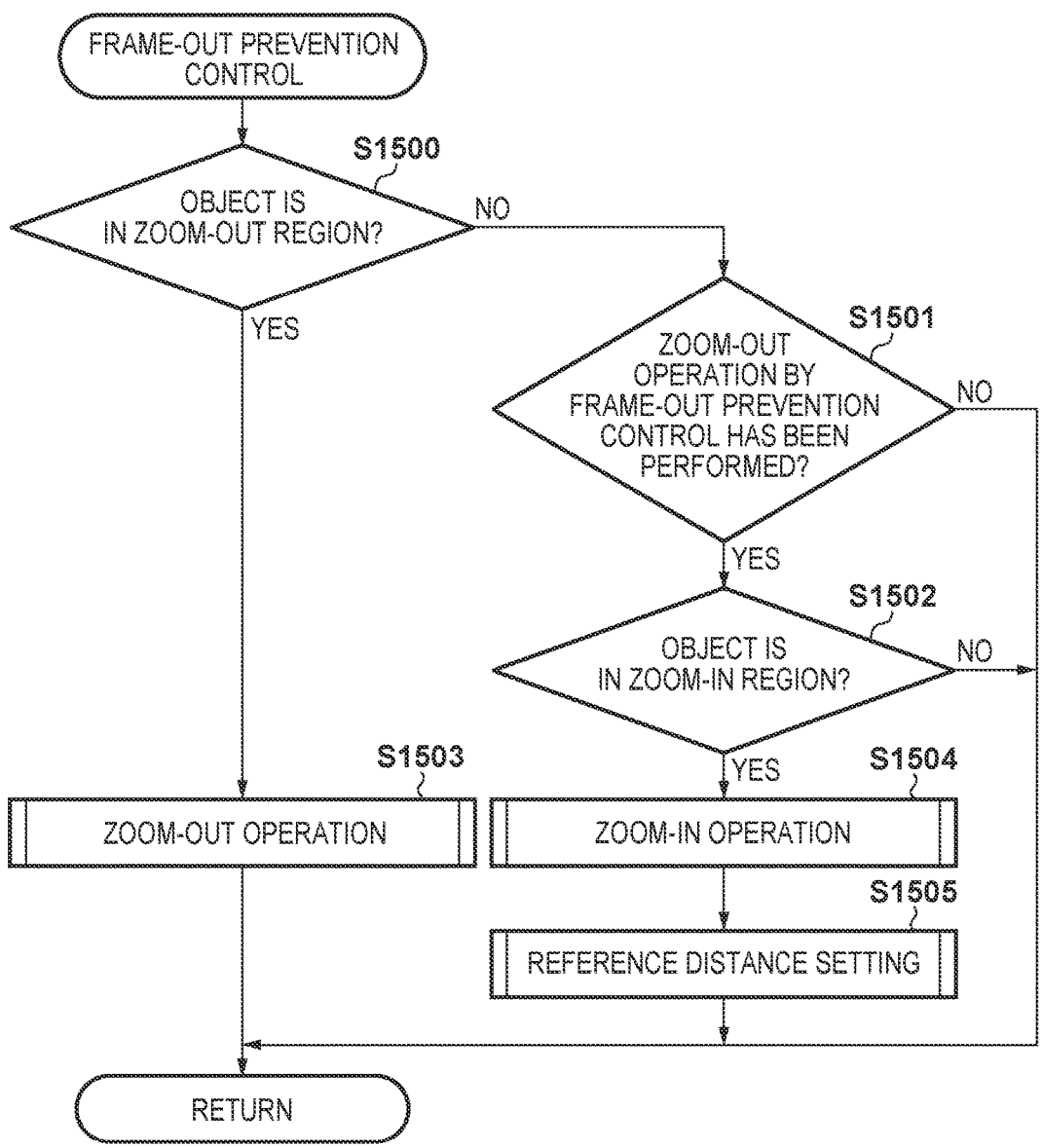
FIG. 15 is a flowchart showing detailed frame-out prevention control processing in FIG. 14.

Here, frame-out prevention control of step S1403 will be described with reference to FIG. 15. As described with reference to FIGS. 7A to 8C, frame-out prevention control is executed in order to prevent an object from being framed out of the screen.

In step S1500, the AZ control unit 122 determines whether or not the object tracking frame related to the object that is tracked has entered a ZO region. The ZO region is equivalent to the ZO region described with reference to FIG. 7A to 8C. If it is determined in step S1500 that the object tracking frame has entered the ZO region, namely, if it is highly possible that the object will be framed out, the procedure advances to step S1503, where a zoom-out operation is started. The zoom-out operation here is equivalent to the zoom-out operation by frame-out prevention control. After the zoom-out operation, frame-out prevention control ends. On the other hand, if it is determined in step S1500 that the object tracking frame has not entered the ZO region, namely, if the camera captures the object near the center of the screen, the procedure advances to step S1501.

In step S1501, the AZ control unit 122 determines whether or not the immediately preceding zoom operation is a zoom-out operation due to the object tracking frame entering the ZO region in step S1500, namely, a zoom-out operation by frame-out prevention control. If it is determined in step S1501 that a zoom-out operation by frame-out prevention control has been performed, the procedure advances to step S1502, and if it is determined in step S1501 that a zoom-out operation by frame-out prevention control has not been performed, the processing ends.

In step S1502, the AZ control unit 122 determines whether or not the object tracking frame related to the object to be tracked fits within (is contained in) a ZI region. The ZI region is equivalent to the ZI region described with reference to FIGS. 7B to 8C. If it is determined in step S1502 that the object tracking frame does not fit within the ZI region, the processing ends, and if it is determined that the object tracking frame fits within the ZI region, the procedure advances to step S1504. Accordingly, if the camera captures the object near the center of the screen and at the zoom return position such that the object size is within the angle of view, a zoom-in operation is started in step S1504. The zoom-in operation here is equivalent to the zoom-in operation by frame-out prevention control.

In step S1505, it is assumed that frame-out prevention control has been executed due to the object having moved, and thus the AZ control unit 122 updates the reference distance by performing reference distance setting processing in FIG. 13, and ends the processing.

Figure 14:
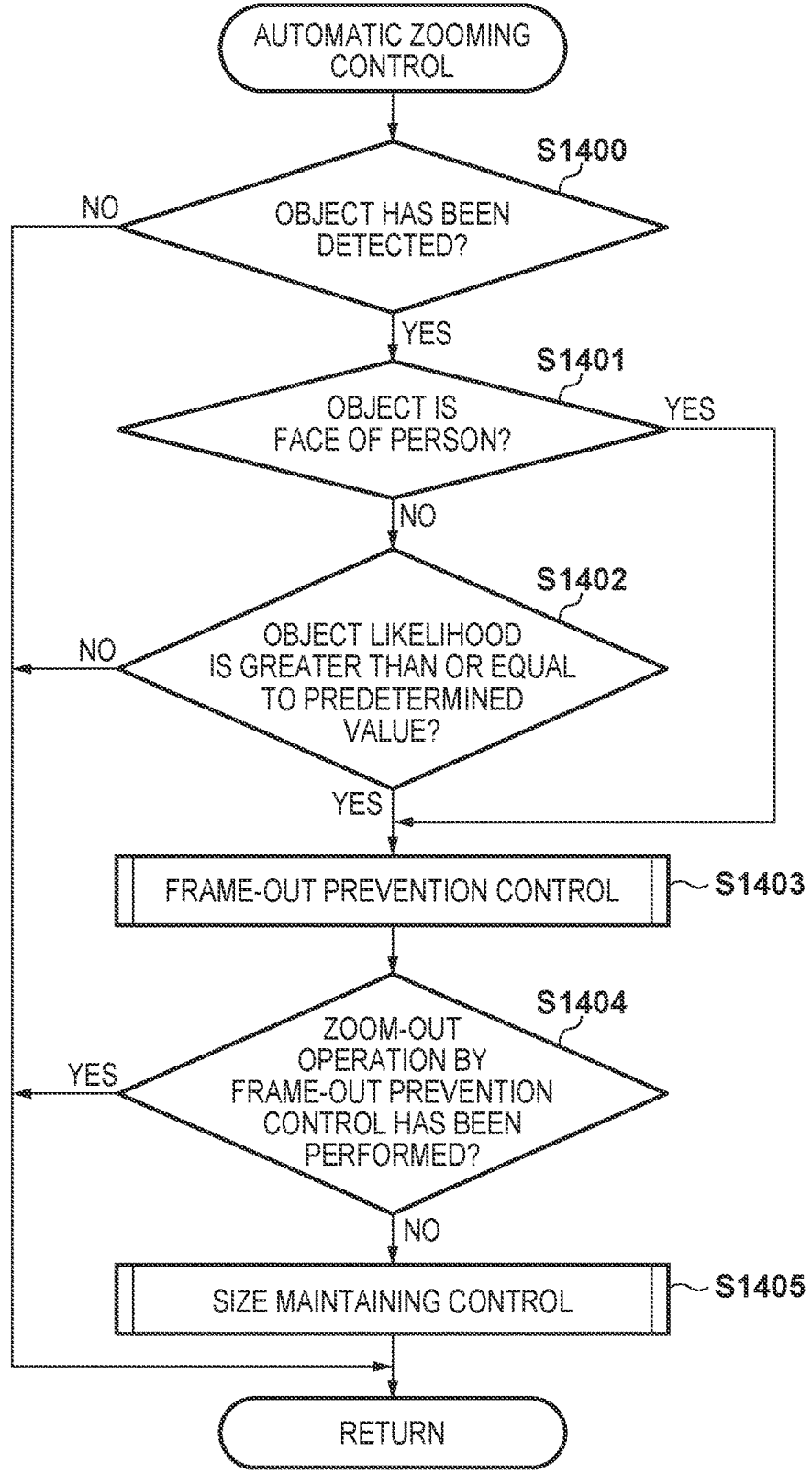
FIG. 14 is a flowchart showing detailed automatic zooming control processing in FIG. 11.

Returning to the description with reference to FIG. 14, when the frame-out prevention control of step S1403 ends, the procedure advances to step S1404. In step S1404, the AZ control unit 122 determines whether or not the immediately preceding zoom operation is a zoom-out operation caused by the object tracking frame entering the ZO region in step S1500 in FIG. 15, namely, a zoom-out operation by frame-out prevention control. If it is determined in step S1404 that a zoom-out operation by frame-out prevention control has been performed, the AZ control unit 122 ends the processing, and if it is determined that a zoom-out operation by frame-out prevention control has not been performed, the procedure advances to step S1405, where size maintaining control is performed. In this embodiment, in order to successfully perform both frame-out prevention control and size maintaining control in the automatic zooming function, first, the object is placed in near the center of the screen by performing frame-out prevention control to enable size maintaining control to be executed. Therefore, after the zoom-out operation by frame-out prevention control, size maintaining control for maintaining the object size constant, which will be described later, is not executed. In other words, if frame-out prevention control has been executed, execution of size maintaining control is restricted until the zoom-in operation by frame-out prevention control is complete.

Size Maintaining Control of First Embodiment

Figure 16:
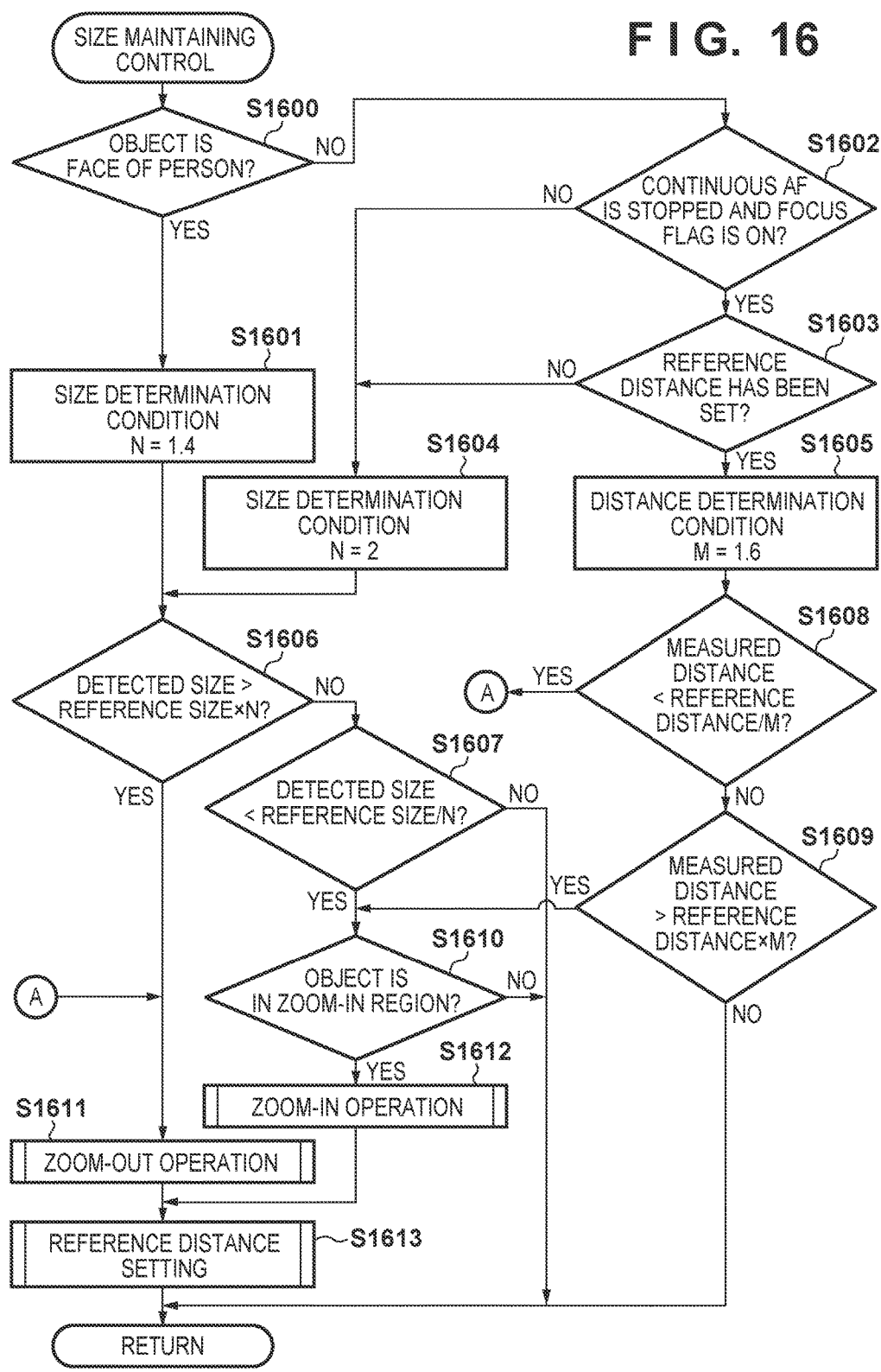
FIG. 16 is a flowchart showing detailed size maintaining control processing in FIG. 14 of the first embodiment.

Next, the size maintaining control of step S1405 in FIG. 14 will be described with reference to FIGS. 16 to 17B. As described with reference to FIGS. 9A to 10F, size maintaining control is performed in order to maintain the size of the object image within a predetermined range from the reference size. FIG. 16 shows size maintaining control of the first embodiment. In the first embodiment, if the object is a body other than a face of a person and the reliability of the object distance is high, automatic zooming control is executed using only the object distance (first information), and if the reliability of the object distance is low, automatic zooming control is executed using only the object size (second information). The processing of steps S1600 to S1605 is processing for setting a condition for determining to start a zoom operation.

In step S1600, the AZ control unit 122 determines whether or not the object detected in step S1400 is a face of a person. If it is determined that the object is a face of a person, the procedure advances to step S1601, and if it is determined that the object is a body other than a face of a person, the procedure advances to step S1602.

In step S1601, the reliability of the object size is relatively high, and thus the AZ control unit 122 sets the change magnification of the object size used for determination for starting a zoom operation to 1.4 times that is smaller than the change magnification of a body other than a person, thereby ensuring high responsiveness to change in object size.

In step S1602, the AZ control unit 122 determines whether or not the AF control state in the continuous AF mode by the AF control unit 124 is the stopped state 502 in FIG. 5, and the focus flag is ON, namely, the object is focused. If it is determined in step S1602 that the object is focused, the procedure advances to step S1603, and if it is determined that the object is not focused, the procedure advances to step S1604.

In step S1603, the AZ control unit 122 determines whether or not the focus change rate has become greater than or equal to a predetermined value in the reference distance setting processing in FIG. 13 and a reference distance has been set. If is determined in step S1603 that a reference distance has not been set, the procedure advances to step S1604, and if it is determined that a reference distance has been set, the procedure advances to step S1605. Accordingly, if it is determined in step S1602 that the object is not focused, or if it is determined in step S1603 that a reference distance has not been set, the reliability of the acquired object distance is low, and thus automatic zooming control is executed using only the object size information.

In step S1604, the AZ control unit 122 sets the change magnification of the object size used for determination for starting a zoom operation to two times, which is greater than the change magnification of a person. Accordingly, if it is determined in step S1602 that the object is focused, and it is determined in step S1603 that a reference distance has been set, automatic zooming control is executed using only the object distance information. In step S1605, the AZ control unit 122 sets the change magnification of the object distance used for determination for starting a zoom operation to 1.6 times.

In the processing of steps S1606 to S1612, determination for starting a zoom operation is performed based on the change magnification of the object size and the object distance, and a zoom operation is executed. If it is determined in step S1600 that the object is a face of a person, if it is determined in steps S1602 and S1603 that the object is a body other than a face of a person, and the reliability of the acquired object distance is low, the procedure advances to step S1606. In step S1606, the AZ control unit 122 compares the detected size of the object detected in step S1400 in FIG. 14 to the size obtained by multiplying the reference size by the magnification. N set in step S1601 or S1604 (N times). If the detected size of the object is greater than N times the reference size, in other words, if the rate of the object image to the screen exceeds a predetermined value, the procedure advances to step S1611.

In step S1611, the AZ control unit 122 starts a zoom-out operation. This zoom-out operation is equivalent to the zoom-out operation for size maintaining control. On the other hand, if in step S1606, the detected size of the object is smaller than or equal to N times the reference size, the procedure advances to step S1607.

In step S1607, the AZ control unit 122 compares the detected size of the object to the reference size. If the detected size of the object is smaller than the size obtained by dividing the reference size by the magnification N set in step S1601 or S1604 (1/N times), in other words, if the ratio of the object image to the screen is smaller than the predetermined value, the procedure advances to step S1610. On the other hand, if the detected size of the object is greater than or equal to 1/N times the reference size, automatic zooming control ends.

In step S1610, the AZ control unit 122 determines whether or not the object tracking frame related to the object to be tracked fits within (is included in) the ZI region. This is for preventing the object from being framed out due to a zoom-in operation, if the object is in the periphery of the screen. This ZI region is equivalent to the ZI region described with reference to FIGS. 9E and 10E. If it is determined in step S1610 that the object tracking frame does not fit within the ZI region, automatic zooming control ends, and if it is determined that the object tracking frame fits within the ZI region, the procedure advances to step S1612.

In step S1612, the AZ control unit 122 starts a zoom-in operation. This zoom-in operation is equivalent to the zoom-in operation for size maintaining control. In this manner, in this embodiment, in order to also prevent frame-out of the object in a zoom-in operation for size maintaining control, the zoom-in operation is started after the object image fits within the ZI region. After the zoom-in operation, the procedure advances to step S1613.

In step S1613, the AZ control unit 122 updates the reference distance by performing reference distance setting processing in FIG. 13, and ends the processing.

On the other hand, if it is determined in the determination in steps S1602 and S1603 that the object is a body other than a face of a person and the reliability of the acquired object distance is high, the procedure advances to step S1608. In step S1608, the AZ control unit 122 compares the acquired object distance to the distance obtained by dividing the reference distance by the magnification set in step S1605 (1/M times). If the object distance acquired by the AF control unit 124 is smaller than 1/M times the reference distance, in other words, if the object has approached by more than a predetermined distance, the procedure advances to step S1611.

In step S1611, the AZ control unit 122 starts a zoom-out operation. On the other hand, if in step S1608, the acquired object distance is greater than or equal to 1/M times the reference distance, the procedure advances to step S1609. In step S1609, the AZ control unit 122 compares the acquired object distance with the reference distance. If the acquired object distance is greater than the size obtained by multiplying the reference distance by the magnification set in step S1605 (M times), in other words, if the object has receded by more than a predetermined distance, the procedure advances to step S1610. On the other hand, if the acquired object distance is less than or equal to M times the reference distance, automatic zooming control ends.

Size Maintaining Control of Second Embodiment

Next, size maintaining control of a second embodiment will be described with reference to FIGS. 17A and 17B. In the second embodiment, if the object is a body other than a face of a person and the reliability of the object distance is high, automatic zooming control is executed using both the object distance (first information) and the object size (second information), and if the reliability of the object distance is low, automatic zooming control is executed using only the object size (second information). Processing of determination for starting a zoom operation in the case where the object is a body other than a face of a person and the reliability of the acquired object distance is high is different between the first embodiment and the second embodiment. Description will be given below focused on the differences.

The processing of steps S1700 to S1704 is similar to the processing of steps S1600 to S1609 in FIG. 16. If it is determined in steps S1700, S1702 and S1703 that the object is a body other than a face of a person and the reliability of the acquired object distance is high, the procedure advances to step S1705. In step S1705, the AZ control unit 122 compares a value obtained by dividing the reference size by the detected size, which is the change magnification of the object size, to a value obtained by dividing the acquired distance by the reference distance, which is the change magnification of the object distance, and determines whether or not the difference between the change magnification of the object size and the change magnification of the object distance is smaller than a predetermined value. Accordingly, if change in object size and change in object distance are based on almost the same change magnification, the reliability of the detected size and the acquired distance of the object can be estimated to be high. In view of this, the condition for determining to start a zoom operation is changed based on a result of comparing the change magnification of the object size to the change magnification of the object distance. If it is determined in step S1705 that the difference between the change magnification of the object size and the change magnification of the object distance is smaller than a predetermined value, the procedure advances to step S1706. In steps S1706 and S1707, the difference between the change magnification of the object size and the change magnification of the object distance is small, and thus the AZ control unit 122 sets the change magnification of the object distance and the object size, which serves as the condition for determining to start a zoom operation, to 1.6 times. On the other hand, if it is determined in step S1705 that the difference between the change magnification of the object size and the change magnification of the object distance is greater than or equal to the predetermined value, the procedure advances to step S1708. In steps S1708 and S1709, the difference between the change magnification of the object size and the change magnification of the object distance is large, and thus the AZ control unit 122 sets the change magnification for the object distance and the object size, which serves as the condition for determining to start a zoom operation, to 2 times.

In step S1713, the AZ control unit 122 compares the acquired object distance to a distance obtained by dividing the reference distance by the magnification set in step S1706 or S1708 (1/M times). If the acquired object distance is smaller than 1/M times the reference distance, in other words, if it is determined that the object has approached by a predetermined distance, the procedure advances to step S1715. In step S1715, the AZ control unit 122 starts a zoom-out operation. On the other hand, if the acquired object distance is greater than or equal to 1/M times the reference distance, the procedure advances to step S1714.

In step S1714, the AZ control unit 122 compares the acquired object distance with a distance obtained by multiplying the reference distance by the magnification set in step S1706 or S1708 (M times). If the acquired object distance is greater than M times the reference distance, in other words, if it is determined that the object has receded by more than the predetermined distance, the procedure advances to step S1712. On the other hand, if the acquired object distance is smaller than or equal to P times the reference distance, the procedure advances to step S1710. In size maintaining control of the second embodiment, if movement of the object has not been determined using the object distance, determination of movement of the object is continuously performed again using the object size. In steps S1710 to S1717, similarly to the processing of steps S1606 to S1613 in FIG. 16, object size change determination is performed using the magnification set in step S1707 or S1709.

Zoom Operation

Figure 18:
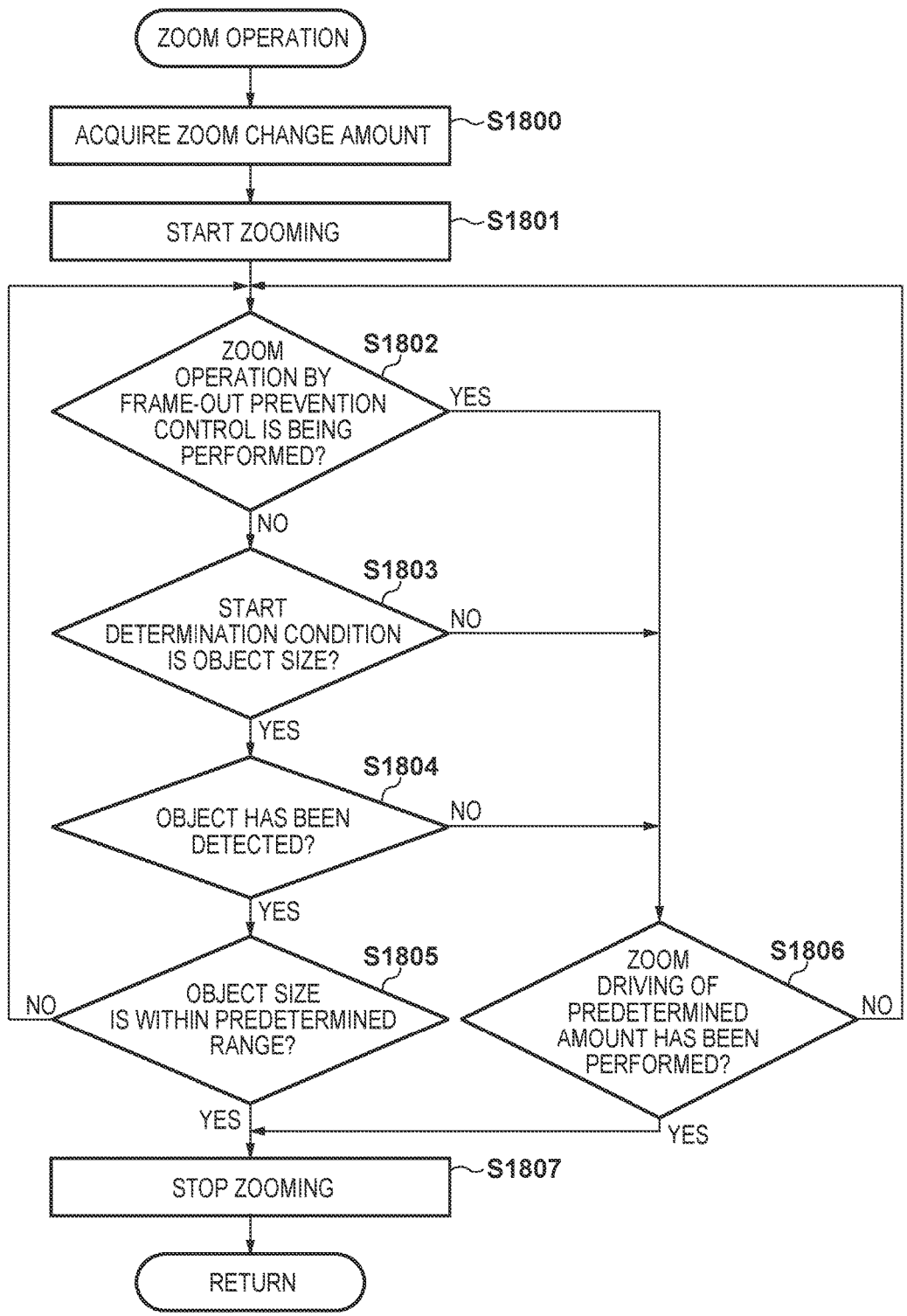
FIG. 18 is a flowchart showing a processing procedure during a zoom operation of the embodiments of the present invention.

Next, the zoom-out operations or the zoom-in operations in steps S1503 and S1504 in FIG. 15, steps S1611 and S1612 in FIG. 16, and steps S1715 and S1716 in FIG. 17A be described with reference to FIG. 18.

In step S1800, the AZ control unit 122 acquires a zoom change amount (a change amount of zoom magnification) from the memory 118. In the case of a zoom-out operation by frame-out prevention control, the zoom-out change amount is set in accordance with detected object information. Specifically, in the zoom-out operation by frame-out prevention control (step S1503 in FIG. 15), the smaller the size of the object is, the smaller the zoom-out change amount is set. Accordingly, it is possible to avoid a state in which the object cannot be detected due to the size of the object having been reduced excessively by the zoom-out operation. Note that a configuration may be adopted in which, in consideration of the minimum size with which the object can be detected, a zoom-out operation is not performed if the size of the object is smaller than a predetermined size. In addition, in a zoom-in operation by frame-out prevention control, the zoom magnification before the zoom-out operation is started is stored in the memory 118, and the zoom-in change amount is set such that a zoom magnification that is the same as that before starting the zoom-out operation is obtained.

Moreover, in a zoom-out operation based on the object size in size maintaining control (step S1611 in FIG. 16, step S1715 in FIG. 17A), a zoom-out change amount (1/N times) corresponding to predetermined. N times used for determination in step S1606 or S1710 is set. Accordingly, even if an object cannot be detected, a minimum zoom-out operation can be performed until the size of the object reaches a reference object size. Similarly, also in the case of a zoom-in operation based on the object size in size maintaining control (step S1612 in FIG. 16, step S1716 in FIG. 17A), a zoom-in change amount (N times) corresponding to predetermined 1/N tames used for determination in step S1607 or S1711 is set. Furthermore, in a zoom-out operation based on the object distance in size maintaining control (step S1608 in FIG. 16, step S1713 in FIG. 17B), a zoom-out change amount (1/M times) corresponding to predetermined 1/M times used for determination in step S1608 or S1713 is set. Accordingly, even if the object size is not determined, a zoom-out operation can be performed such that the size of the object becomes substantially the same. Similarly, also in the case of a zoom-in operation based on the object distance in size maintaining control (step S1609 in FIG. 16, step S1714 in FIG. 17B), a zoom-in change amount (N times) corresponding to predetermined N times used for determination in step S1609 or S1714 is set.

In step S1801, the AZ control unit 122 sets, for the CZ control unit 119 or the electronic zooming control unit 120, the zoom change amount acquired in step S1800, and starts resizing processing.

In step S1802, the AZ control unit 122 determines whether a zoom operation of either frame-out prevention control or size maintaining control is being performed. If the current zoom operation is a zoom operation by frame-out prevention control (step S1503 and S1504 in FIG. 15), the procedure advances to step S1806. In addition, if the current zoom operation is a zoom operation for size maintaining control (steps S1611 and S1612 in FIG. 16, steps S1715 and S1716 in FIG. 17A), the procedure advances to step S1803.

In step S1803, the AZ control unit 122 determines whether the size maintaining control is based on the object size or the object distance. In the case of size maintaining control that is based on the object size, the procedure advances to step S1804, and in the case of size maintaining control that is based on the object distance, the procedure advances to step S1806. In step S1804, the AZ control unit 122 determines whether or not an object has been detected by the object detection unit 123. If an object has been detected, the procedure advances to step S1805, and if an object has not been detected, the procedure advances to step S1806.

In step S1805, the AZ control unit 122 compares a reference object size indicated by reference object information to the size of the object detected in step S1804. If the size of object detected in step S1804 and the reference object size do not fit within a range of a predetermined ratio (within a predetermined change amount), the procedure returns to step S1802, where zoom operation determination is continued. If the size of the object detected in step S1804 and the reference object size are brought within the range of a predetermined ratio by a zoom operation, the procedure advances to step S1807. In step S1807, the AZ control unit 122 stops the zoom operation, and ends the processing.

If it is determined in step S1802 that a zoom operation by frame-out prevention control is being performed, if it is determined in step S1803 that a zoom operation based on the object distance in size maintaining control is being performed, or if an object is not detected during a zoom operation that is based on the object size in size maintaining control in step S1804, the procedure advances to step S1806. In step S1806, the AZ control unit 122 determines, based on the zoom change amount acquired in step S1800, whether or not resizing processing equivalent to a predetermined zoom change amount for each zoom operation has been performed. If resizing processing by the predetermined zoom change amount has not been performed, the procedure returns to step S1802, where the processing is continued. In addition, if resizing processing by the predetermined zoom change amount has been performed, the procedure advances to step S1807, where the AZ control unit 122 stops the zoom operation and ends the processing.

As described above, according to this embodiment, automatic zooming control is executed based on the position and the size of an object calculated by the object detection unit 123 and the distance to the object acquired by the AF control unit 124. In addition, automatic zooming is prevented from malfunctioning by changing zooming control based on the reliability of the position and the size of the object and the reliability of the distance to the object. Accordingly, even in the case of an object other than a person, it is possible to perform appropriate automatic zooming control. Note that, in this embodiment, the object distance is acquired using the zoom position, the focus position and the focus cam table, but a method for obtaining the object distance is not limited thereto, and for example, the object distance may be obtained by measuring the distance to the object using a laser. Moreover, if information regarding the object distance can be obtained, it is not necessary to obtain the object distance itself. For example, instead of providing a threshold for the object distance, a threshold may be provided for a focus position for each zoom position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-054469, filed Mar. 17, 2016 which is hereby incorporated by reference herein in its entirety.

What is claimed is:

1. A zooming control apparatus comprising:
an object detection unit configured to detect an object from an image;
a first acquisition unit configured to acquire information regarding a distance to the object; and
a zooming control unit configured to perform one of a first zooming control for automatically changing a zoom magnification according to first information that includes information regarding a size of the object detected by the object detection unit and a second zooming control, that is different from the first zooming control, for automatically changing a zoom magnification according to second information regarding the distance to the object acquired by the first acquisition unit,
wherein the zooming control unit determines whether to perform the first zooming control or the second zooming control in accordance with whether or not the object is a face.

2. The apparatus according to claim 1, wherein when the object is a face, the zooming control unit performs the first zooming control.

3. The apparatus according to claim 2, wherein when the object is not the face, the zooming control unit performs the second zooming control.

4. The apparatus according to claim 2, wherein when the object is not the face and the imaging optical system is not focused on the object, the zooming control unit performs the first zooming control.

5. The apparatus according to claim 2, wherein when the object is not the face and the imaging optical system is focused on the object, the zooming control unit performs the second zooming control.

6. The apparatus according to claim 1, wherein the information regarding a distance to the object is not used in the first zooming control.

7. A control method of a zooming control apparatus comprising:
- detecting an object from an image;
- acquiring information regarding a distance to the object; and
- determining whether to perform one of a first zooming control and a second zooming control that is different from the first zooming control in accordance with whether or not the object is a face; and
- performing a zooming control for automatically changing a zoom magnification based on the determination,
- wherein the first zooming control automatically changes a zoom magnification according to first information that includes information regarding a size of the detected object and the second zooming control automatically changes a zoom magnification according to second information regarding the distance to the object.

* * * * *